(12) United States Patent
Harada et al.

(10) Patent No.: US 12,253,597 B2
(45) Date of Patent: Mar. 18, 2025

(54) ULTRASONIC SENSOR AND SENSOR ATTACHMENT

(71) Applicant: DENSO CORPORATION, Kariya (JP)

(72) Inventors: Taketo Harada, Kariya (JP); Keisuke Ueda, Kariya (JP)

(73) Assignee: DENSO CORPORATION, Kariya (JP)

(*) Notice: Subject to any disclaimer, the term of this patent is extended or adjusted under 35 U.S.C. 154(b) by 82 days.

(21) Appl. No.: 17/938,599

(22) Filed: Oct. 6, 2022

(65) Prior Publication Data

US 2023/0057481 A1 Feb. 23, 2023

Related U.S. Application Data

(63) Continuation of application No. PCT/JP2021/011410, filed on Mar. 19, 2021.

(30) Foreign Application Priority Data

Apr. 10, 2020 (JP) .................................. 2020-071346

(51) Int. Cl.
*G01S 15/931* (2020.01)

(52) U.S. Cl.
CPC ....... *G01S 15/931* (2013.01); *G01S 2015/938* (2013.01)

(58) Field of Classification Search
CPC ....... B60R 19/48; B60R 19/03; G01S 15/931; G01S 7/521; G01S 2015/937; G01S 2015/938; G01S 15/003; G01S 15/02; G01S 15/04; G01S 15/06; G01S 15/50; G01S 15/08; G01S 15/46; G01S 2015/465; G01S 15/52; G01S 15/523; G01S 15/526;
(Continued)

(56) References Cited

U.S. PATENT DOCUMENTS 3,779,592 A * 12/1973 Golze ...................... B60R 19/03
293/120
8,853,919 B2 * 10/2014 Lin ...................... G10K 11/004
310/334
(Continued)

FOREIGN PATENT DOCUMENTS

DE     19752921 A1 *  6/1999 ........... G01D 11/245
DE  102014200056 A1 *  7/2015 ......... A63B 69/0097
(Continued)

*Primary Examiner* — Daniel L Murphy
*Assistant Examiner* — Amie M Ndure
(74) *Attorney, Agent, or Firm* — Maschoff Brennan

(57) ABSTRACT

A sensor attachment is used in securing an ultrasonic sensor to a plate-like vehicle body member. The ultrasonic sensor is equipped with a cylindrical ultrasonic microphone extending in an axial direction perpendicular to a center axis line. The sensor attachment includes a cylinder which is fit in a through-hole in the vehicle body member and surrounds the ultrasonic microphone in a vehicle-mounted state where the ultrasonic sensor is mounted in the vehicle body member. The cylinder includes a through-hole facing portion which faces an inner surface of the through-hole in proximity thereto in a radial direction perpendicular to the center axis line in the vehicle-mounted state. The through-hole facing portion is designed to have a contact surface-decreasing structure which minimizes an area of contact with the inner surface of the through-hole.

11 Claims, 11 Drawing Sheets

(58) Field of Classification Search
CPC ...... G01S 15/58; G01S 15/582; G01S 15/586;
G01S 15/588; G01S 15/60; G01S 15/62;
G01S 15/66; G01S 15/74; G01S 15/86;
G01S 15/876; G01S 15/874; G01S
15/872; G01S 2205/00; G01S 2205/002;
G01S 2205/007; G01S 2205/006; G01S
7/52036; G01S 15/42; G01S 7/524; G01S
15/89; G01S 15/88; G01S 15/87; G01S
15/8927; G01S 15/8915; G01S 1/72;
H04R 17/00; H04R 1/02; F16F 1/36;
F16F 15/08; B06B 1/0696; B06B 2201/51
USPC ........................................................ 367/140
See application file for complete search history.

(56) References Cited

U.S. PATENT DOCUMENTS

| | | | |
|---|---|---|---|
| 9,322,916 B2* | 4/2016 | Prausse | G01S 7/521 |
| 2007/0115102 A1* | 5/2007 | Nakano | G10K 9/122 |
| | | | 340/435 |
| 2007/0163350 A1* | 7/2007 | Nakano | G01S 7/521 |
| | | | 73/643 |
| 2009/0071255 A1* | 3/2009 | Okuda | G01S 7/521 |
| | | | 73/628 |
| 2009/0223296 A1* | 9/2009 | Sato | G10K 9/22 |
| | | | 73/632 |
| 2013/0214642 A1* | 8/2013 | Lin | B06B 1/0644 |
| | | | 310/334 |
| 2014/0198620 A1* | 7/2014 | Prausse | G01S 15/931 |
| | | | 367/100 |
| 2015/0054670 A1* | 2/2015 | Wang | A61B 5/0816 |
| | | | 342/21 |
| 2016/0006386 A1* | 1/2016 | Kurosawa | H02P 25/034 |
| | | | 318/565 |
| 2018/0074177 A1* | 3/2018 | Rudoy | G01S 15/89 |
| 2019/0391263 A1 | 12/2019 | Ueda et al. | |
| 2020/0142060 A1* | 5/2020 | Ibata | B60R 19/48 |
| 2020/0288224 A1* | 9/2020 | Ueda | G01S 15/931 |
| 2022/0043147 A1* | 2/2022 | Satake | G01S 15/931 |
| 2023/0057481 A1* | 2/2023 | Harada | B60R 19/48 |

FOREIGN PATENT DOCUMENTS

| | | | | |
|---|---|---|---|---|
| EP | 2 407 802 A1 | 1/2012 | | |
| JP | 2013-124870 A | 6/2013 | | |
| JP | 2017-175291 A | 9/2017 | | |
| WO | WO-2016008972 A1 * | 1/2016 | ........... | G01S 15/104 |
| WO | 2017/175385 A1 | 10/2017 | | |
| WO | WO-2018224522 A1 * | 12/2018 | | |

* cited by examiner

ULTRASONIC SENSOR AND SENSOR ATTACHMENT

CROSS REFERENCE TO RELATED DOCUMENT

The present application claims the benefit of priority of Japanese Patent Application No. 2020-71346 filed on Apr. 10, 2020, the disclosure of which is incorporated in its entirety herein by reference.

TECHNICAL FIELD

This disclosure generally relates to an ultrasonic sensor and a sensor attachment for use in attaching such an ultrasonic sensor to a body part of vehicles.

BACKGROUND ART

Patent literature 1 teaches an ultrasonic sensor which is attached to a bumper of a vehicle and used as a corner sonar or a back sonar. The attachment to the bumper is achieved by inserting a body assembly of the ultrasonic sensor from outside the bumper into a hole formed in the bumper. The body assembly includes a main body of the ultrasonic sensor, a bezel, and an anti-vibration member. The bezel is made from synthetic resin in the form of a hollow cylinder. After the body assembly is inserted into the bumper, a retainer is secured to a back surface of the bumper. The retainer is made from synthetic resin and used to secure the main body of the ultrasonic sensor and the bezel to the bumper.

PRIOR ART DOCUMENT

PATENT LITERATURE

PATENT LITERATURE 1

Japanese Patent First Publication No. 2018-146564

SUMMARY OF THE INVENTION

The above type of ultrasonic sensor disclosed in Patent literature 1 has a risk that errors in detection by the ultrasonic sensor may arise from transmission of mechanical vibration between the ultrasonic sensor and a vehicle body member that is an attachment object (i.e., the bumper). It is, therefore, required to minimize the transmission of vibration between the ultrasonic sensor and the vehicle body member as quickly as possible to avoid the errors in detection. This disclosure is made in view of the above problem. It is an object to provide an ultrasonic sensor and a sensor attachment which are capable of reducing the transmission of vibration between the ultrasonic sensor and a vehicle body member that is an attachment object to which the ultrasonic sensor is to be attached.

According to one aspect of this disclosure, there is provide a sensor attachment for use in attaching an ultrasonic sensor to a plate-like vehicle body member. The ultrasonic sensor is equipped with an ultrasonic microphone which is of a cylindrical shape and extends in an axial direction parallel to a center axis line. The sensor attachment comprises: (a) a cylinder which is configured to be disposed in a through-hole formed in the vehicle body member and surrounds the ultrasonic microphone in a vehicle-mounted state where the ultrasonic sensor is mounted in the vehicle body member; and (b) a through-hole facing portion which is defined by a portion of the cylinder and extends in a radial direction perpendicular to the center axis line so as to face an inner surface of the through-hole in proximity thereto to be contactable with the inner surface in the vehicle-mounted state. The through-hole facing portion is configured to have a contact surface-decreasing structure which is configured to minimize an area of contact with the inner surface of the through-hole.

According to another aspect of this disclosure, there is provide an ultrasonic sensor which comprises: (a) the above-described sensor attachment; (b) the above-described ultrasonic microphone; (c) a cushion which is of a cylindrical shape and made from an elastic synthetic material, the cushion being disposed in the cylinder and surrounding the ultrasonic microphone; and (d) an anti-vibration spacer which is made from an elastic synthetic material and arranged between the flange and the vehicle body member.

The cylinder has a flange which is arranged on an end thereof facing in the axial direction and extends in the radial direction to face a portion of an outer surface of the vehicle body member around the through-hole in the vehicle-mounted state. The flange is shaped to have an outer diameter larger than a size of the through-hole.

Reference marks or numbers in parentheses are attached to elements described in this application. Such reference marks or numbers merely represent an example of a correspondence relation between the elements and parts in the following embodiments. This disclosure is, therefore, not limited to the embodiments by use of the reference marks or numbers.

MODES FOR CARRYING OUT THE INVENTION

EMBODIMENTS

Embodiments in this disclosure will be described below with reference to the drawings. Possible modifications of each embodiment will be all discussed following explanation of the embodiments in order not to disturb understanding of each embodiment.

Vehicle Structure

Figure 1:
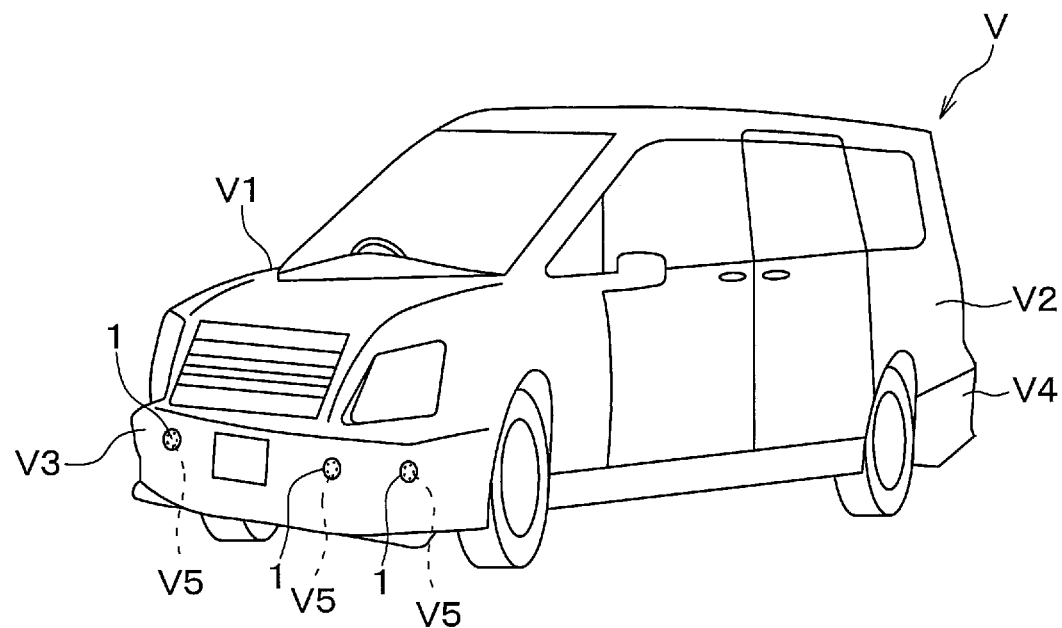
FIG. 1 is a perspective view which illustrates an outer appearance of a vehicle in which ultrasonic sensors are installed according to embodiments.

Referring to FIG. 1, the ultrasonic sensors 1 in this embodiment are configured as vehicle-mounted clearance sonars attached to the vehicle V. Each of the ultrasonic sensors 1 mounted in the vehicle V works to detect an object(s) around the vehicle V.

The vehicle V is a four-wheeled automotive vehicle and equipped with the box-shaped vehicle body V1 the body panel V2 that is a plate-like body member, i.e., an exterior body panel, the front bumper V3, and the rear bumper V4. The front bumper V3 is attached to a front end of the vehicle body V1. The rear bumper V4 is attached to a rear end of the vehicle body V1. The front bumper V3 and the rear bumper V4 are made of metallic plates.

Some of the ultrasonic sensors 1 are configured to be secured to the front bumper V3 to detect an object existing in front of or on a front lateral side of the vehicle V. The other ultrasonic sensors 1 are also configured to be secured to the rear bumper V4 to detect an object existing in the back of or a rear lateral side of the vehicle V. In the following discussion, the state where each of the ultrasonic sensors 1 is attached to the front bumper V3 or the rear bumper V4 secured to the vehicle body V1 will be referred to as an on-vehicle state or a vehicle-mounted state.

Specifically, in the vehicle-mounted state, a plurality of (e.g., four) ultrasonic sensors 1 are mounted in the front bumper V3. The ultrasonic sensors 1 in the front bumper V3 are located away from each other in the width-wise direction of the vehicle V. Similarly, a plurality of (e.g., four) ultrasonic sensors 1 are mounted in the rear bumper V4. Each of the front bumper V3 and the rear bumper V4 has formed therein the mounting holes V5 in which the ultrasonic sensors 1 are installed. The mounting or demounting of the ultrasonic sensors 1 in or from the front bumper V3 is usually achieved after the front bumper V3 is removed from the vehicle body V1. The vehicle-mounted state, as referred to in this disclosure, also includes a state where the ultrasonic sensors 1 are merely installed in the front bumper V3 without the front bumper V3 being attached to the vehicle body V1. The same applies to the mounting or demounting of the ultrasonic sensors 1 in or from the rear bumper V4.

First Embodiment

Figure 2A:
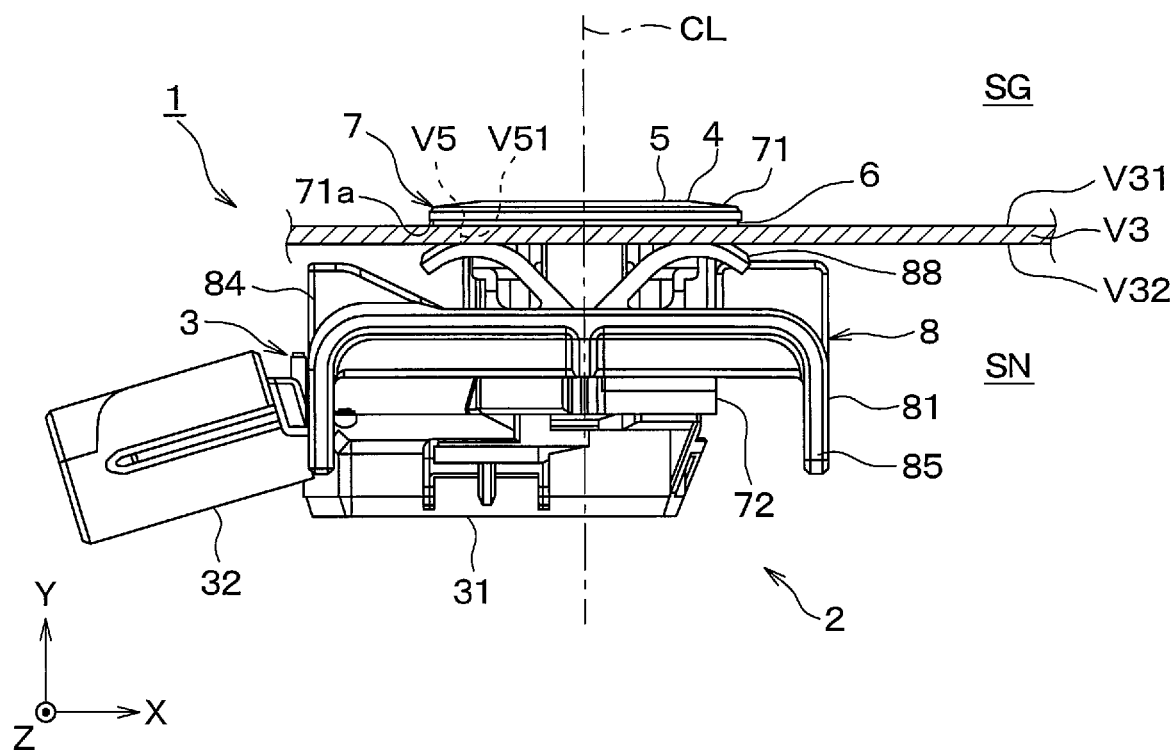
FIG. 2A is a plan view which illustrates one of the ultrasonic sensors mounted in the vehicle illustrated in FIG. 1.
Figure 2B:
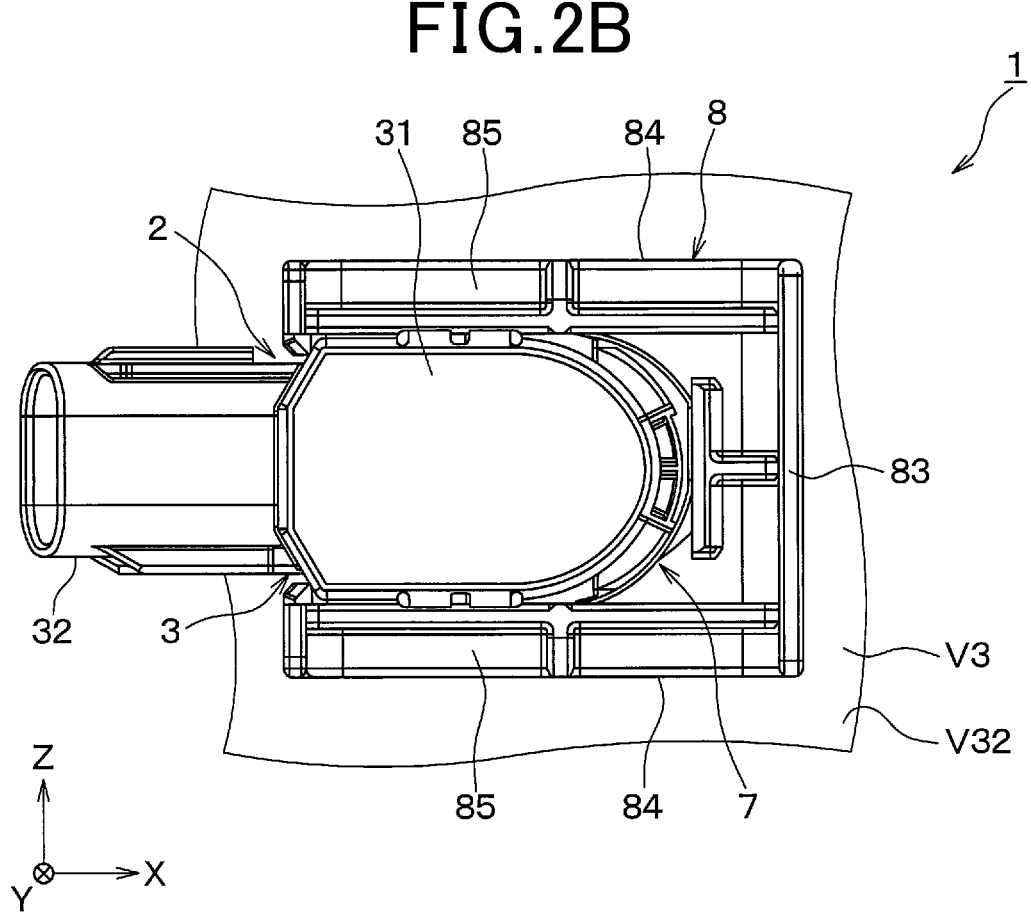
FIG. 2B is a rear view which illustrates one of the ultrasonic sensors mounted in the vehicle illustrated in FIG. 1.
Figure 2C:
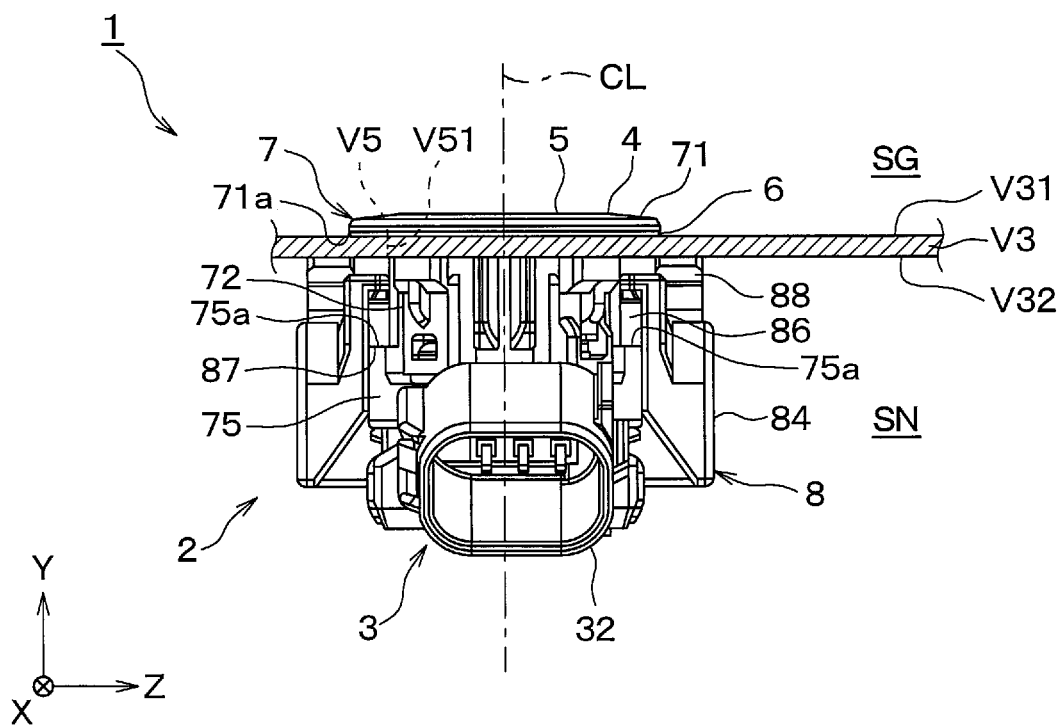
FIG. 2C is a right side view of one of the ultrasonic sensors mounted in the vehicle illustrated in FIG. 1.

FIGS. 2A to 2C illustrate the vehicle-mounted state of only one of the ultrasonic sensors 1 attached to the front bumper V3 for the brevity of illustration. The following discussion will refer to the structure of the ultrasonic sensor 1 in the first embodiment with reference to FIG. 2A. For the sake of convenience of explanation, a right-handed Cartesian coordinate (X, Y, Z) system is defined based on a direction of gravity's pull in the vehicle-mounted state. In the illustrated right-handed coordinate system, an upward direction (i.e., a vertical direction) will be referred to as a positive Z-axis direction. The vertical direction, as referred to herein, is a direction opposite to a direction of the force of gravity when the vehicle Vis placed in a drivable condition on a horizontal plane. The upward direction, as referred to herein, coincides with an upward vertical direction or a direction oriented at a small acute angle a (e.g., 10° or less) to the upward vertical direction. The positive Z-axis direction, therefore, becomes identical with the upward vertical direction or a direction traversing the upward vertical direction depending upon the configuration of the front bumper V. Similarly, the Y-axis direction becomes identical with the horizontal direction or a direction traversing the horizontal direction.

Referring to FIGS. 2A to 2C, the front bumper V3 has an outer bumper surface V31 and an inner bumper surface V32.

The outer bumper surface V31 is an outside surface of the front bumper V3 which faces or is exposed to the bumper-outside space SG existing outside the vehicle V in the vehicle-mounted state. The inner bumper surface V32 is an inside surface of the outer bumper surface V31 which faces or is exposed to the bumper-inside space SN existing inside the vehicle V in the vehicle-mounted state. Each of the mounting holes V5 opens at the outer bumper surface V31 and the inner bumper surface V32, in other words, extends through a thickness of the front bumper V3. Each of the mounting holes V5 is in the form of a circular hole defining a circular cylindrical space in the front bumper V3. Each of the mounting holes V5, therefore, has a cylindrical inner surface V51.

Each of the ultrasonic sensors 1 is configured to generate or sense ultrasound energy. Specifically, each of the ultrasonic sensors 1 is designed to emit a detecting wave in the form of ultrasound into the bumper-outside space SG along the center axis line CL. Each of the ultrasonic sensors 1 also works to receive a wave including a return (which will also be referred to as a reflected wave) of the detecting wave from an object existing in the bumper-outside space SG and analyze the received wave to output a sensing signal created using results of the analysis of the received signal.

In the illustrated right-handed coordinate (X, Y, Z) system, a direction in which the detecting wave is outputted and which extends parallel to the center axis line CL that coincides with a directivity axis (i.e., an axis of maximum radiation intensity) of each of the ultrasonic sensors 1 will also be referred to as a positive Y-axis direction. The directivity axis, as referred to herein, is defined by an imaginary straight line extending in a direction in which ultrasound, as emitted from the ultrasonic sensor 1, travels. The directivity axis serves as a base for defining a directivity angle. The directivity axis is also referred to as a center directivity axis or a sensing axis. A positive Y-axis direction oriented parallel to the directivity axis will also be referred to as an axial direction. In the following discussion, assuming that a member shaped to extend in the axial direction has ends opposed to each other in the axial direction, one of the ends of the member which faces in the positive Y-axis direction will also be referred to as a front end or a front end portion facing in the axial direction, while the other end of the member which faces in a negative Y-axis direction will also be referred to as a base end or a base end portion facing in the axial direction. A dimension of a member or a part of the member, as discussed below, which is measured in the axial direction will also be referred to as an axial direction dimension.

In the following discussion, a direction perpendicular to the axial direction will also be referred to as an in-plane direction which extends parallel to an X-Z plane. The shape of a member, as viewed on a plane extending orthogonal to the center axis line CL, in other words, as projected onto the X-Z plane, will also be referred to as an in-plane shape.

The in-plane direction includes a radial direction and a circumferential direction. The radial direction is defined as a direction extending radially from the center axis line CL. In other words, the radial direction is oriented at right angles to the center axis line CL and extends away from the center axis line CL. Specifically, given a point of intersection of the center axis line CL with an imaginary plane, as defined perpendicular to the center axis line CL, and an initial point that is such a point of intersection, the radial direction coincides with a direction along a half-line defined to extend from the initial point on the imaginary plane. In other words, given an imaginary circle defined on the imaginary plane, and the center of the imaginary circle lying at the point of intersection between the imaginary plane and the center axis line CL, the radial direction is a direction along the radius of the imaginary circle. The circumferential direction is defined along a circumference of the above imaginary circle extending around the center axis line CL.

Each of the ultrasonic sensors 1 is mounted in the vehicle V to have the center axis line CL extending substantially parallel to a thickness-wise direction of a portion of the front bumper V3 which is near a mounting location where a corresponding one of the ultrasonic sensors 1 is attached to the front bumper V3. The mounting location, as referred to herein, is where each of the ultrasonic sensors 1 is attached to the front bumper V3, in other words, the center of each of the mounting holes V5. The center of each of the mounting holes V5, as referred to herein, is the center of a circle defined by a line of intersection between the edge of the cylindrical inner surface V51 of the mounting hole V5 and the outer bumper surface V31 or the inner bumper surface V32. In other words, the center of each of the mounting holes V5 may be presumed to the position of the center axis line CL on an X-Z coordinate plane in the vehicle-mounted state or the bumper- mounted state.

Referring to FIGS. 2A to 2C and 3, each of the ultrasonic sensors 1 is equipped with the sensor body 2. The sensor body 2 includes the sensor case 3, the cushion 4, and the ultrasonic microphone 5. The sensor body 2 is attached to the front bumper V3 using the anti-vibration spacer 6, the bezel 7, and the retainer 8. The parts of each of the ultrasonic sensors 1 will be described below in detail.

Sensor Case

Figure 3:
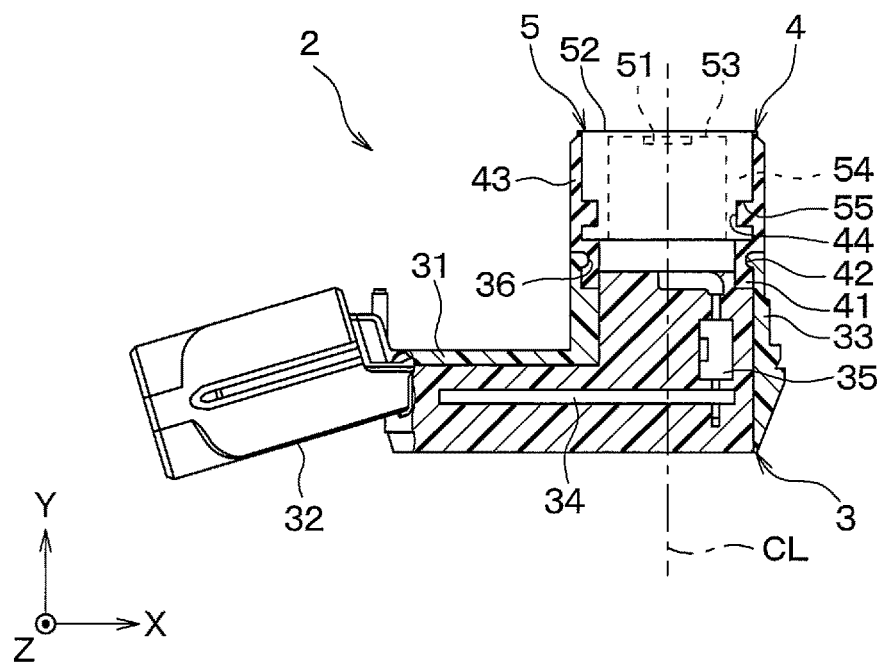
FIG. 3 is a partial sectional view which schematically illustrates a structure of a sensor body shown in FIG. 2A.

FIG. 3 illustrates the sensor body 2 after the retainer 8 is removed from the ultrasonic sensor 1 illustrated in FIGS. 2A to 2C, pulling a sub-assembly of the ultrasonic sensor 1 from which the retainer 8 is removed toward the bumper-outside space SG, and then dismounting the bezel 7 from the sub-assembly. The sub- assembly, as referred to herein, is an assembly of the sensor body 2 to which the anti-vibration spacer 6 and the bezel 7 are attached. Referring to FIG. 3, the sensor case 3 serving as a housing of the ultrasonic sensor 1, i.e., the sensor body 2 includes the box 31, the connector 32, and the microphone support 33. The sensor case 3 is made in the form of a one-piece from a hard synthetic resin, such as polybutylene terephthalate, acrylonitrile- butadiene-styrene (ABS) resin, polypropylene, polycarbonate, or polystyrene.

The box 31 is of a flat-box shape and has a length extending in the X-axis direction and a thickness in the Y-axis direction in the bumper-mounted state. The box 31 has the circuit board 34 disposed therein. The circuit board 34 is electrically connected to the ultrasonic microphone 5 using the connecting wires 35.

The boxy 31 has a length with a first end (i.e., a left end, as viewed in FIGS. 2A and 3) and a second end opposed to the first end. The connector 32 extends from the first end of the box 31 horizontally and obliquely backward in the vehicle-mounted state. In other words, the connector 32 extends away from the front bumper V3 in the bumper-mounted state. The connector 32 is designed in the form of a receptable connector which is joinable to or detachable from a plug connector, not shown, attached to an end of a wire harness used for electrical connection with an external device, such as an electronic control unit (ECU).

The microphone support 33 extends in the axial direction from the second end (i.e., a right end, as viewed in FIGS. 2A and 3) of the box 31. The microphone support 33 is of a hollow cylindrical shape surrounding the center axis line CL. In this embodiment, the microphone support 33 is shaped to have a center axis coinciding with the center axis line CL. The microphone support 33 has a front end which faces in the axial direction and on which the joint protrusion 36 is formed. The joint protrusion 36 is designed in the form of a protrusion extending toward the center axis line CL from a cylindrical inner wall of the microphone support 33 surrounding the center axis line CL. The joint protrusion 36 also extends on an entire circumference of the inner wall of the microphone support 33.

Cushion

The cushion 4 is made in the form of a hollow cylinder from an elastic synthetic resin, such as silicon rubber, and surrounds the center axis line CL. Specifically, the cushion 4 in this embodiment is of a hollow cylindrical shape surrounding the center axis line CL and has an outer diameter substantially identical with that of the microphone support 33.

The cushion 4 has the supported portion 41 that is a base end facing in the axial direction and is secured at the supported portion 41 to the microphone support 33. Specifically, the supported portion 41 has formed therein the joint groove 42 opening in the radial direction. The joint groove 42 is shaped to achieve a mechanical joint to the joint protrusion 36 of the microphone support 33. The joint groove 42 extends in the circumferential direction.

The microphone housing 43 which is located closer to the front end of the sensor body 2 than the supported portion 41 of the cushion 4 is in the axial direction is shaped to have the ultrasonic microphone 5 disposed substantially fully therein without protruding outside the microphone housing 43 in the axial direction. In other words, the microphone housing 43 has a cylindrical inner chamber contoured to conform with an outer shape of the ultrasonic microphone 5.

The microphone housing 43 is equipped with a pair of joint protrusions 44. The joint protrusions 44 are diametrically opposed to each other through the center axis line CL. The joint protrusions 44 are countered to achieve mechanical fits quadrangular grooves and extend toward the center axis line CL. Each of the joint protrusions 44 has a rectangular cross section also extends in the Z-axis direction as viewed in the drawings.

As apparent from the above discussion, the cushion 4 which has the base end and the front end opposed to the base end in the axial direction is secured at the base end to the sensor case 3 and elastically retains the ultrasonic microphone 5 in the front end. The ultrasonic microphone 5 is, therefore, held by the sensor case 3 through the cushion 4.

The cushion 4 works to minimize transmission of mechanical vibration between the sensor case 3 and the ultrasonic microphone 5. The cushion 4 is shaped to surround the ultrasonic microphone 5 and disposed inside the bezel 7 in an assembled state. The assembled state, as referred to herein, is a state where the anti-vibration spacer 6 and the bezel 7 are attached to the sensor body 2. The above-described sub- assembly is in the assembled state. The bumper-mounted state and the vehicle-mounted state are also equivalent to the assembled state. The cushion 4 is located between the ultrasonic microphone 5 and the front bumper V3 in the vehicle-mounted state to absorb mechanical vibration transmitting between the ultrasonic microphone 5 and the front bumper V3.

Ultrasonic Microphone

The ultrasonic microphone 5 is of a cylindrical outer shape extending in the axial direction. Specifically, the ultrasonic microphone 5 is in the shape of a circular cylinder whose center axis coincides with the center axis line CL.

The ultrasonic microphone 5 includes the ultrasonic device 51 and the microphone case 52. The ultrasonic device 51 is implemented by an electrical energy-to-mechanical energy transducer made of a thin-film piezoelectric device. The ultrasonic device 51 is disposed inside the microphone case 52.

The microphone case 52 serves as a housing for the ultrasonic microphone 5 and is made in the form of a bottomed hollow cylinder from a metallic material, such as aluminum. Specifically, the microphone case 52 includes the diaphragm 53 and the side plate 54.

The diaphragm 53 is in the form of a thin plate having a thickness, as measured in the axial direction. The diaphragm 53 is arranged to close a front end of the side plate 54 which faces in the axial direction. In the bumper-mounted state or the vehicle- mounted state, the diaphragm 53 is oriented to have a smooth outer surface exposed to the bumper-outside space SG. The diaphragm 53 has an inner surface which is opposed to the outer surface thereof and on which the ultrasonic device 51 is fixed.

The side plate 54 of the microphone case 52 is of a substantially hollow cylindrical shape and extends in the axial direction. The side plate 54 has formed therein a pair of joint grooves 55 contoured to achieve fits with the joint protrusions 44.

Anti-Vibration Spacer

Figure 4A:
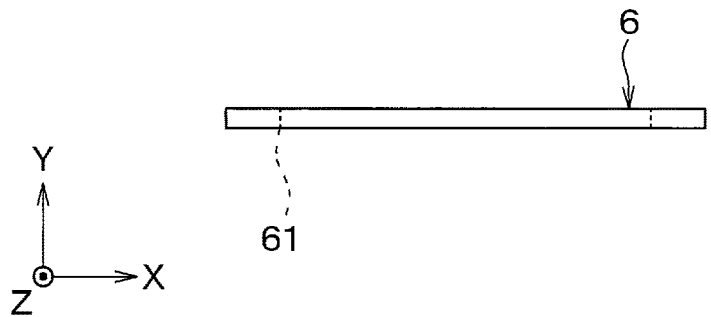
FIG. 4A is an enlarged plan view which illustrates an anti-vibration spacer shown in FIG. 2A.
Figure 4B:
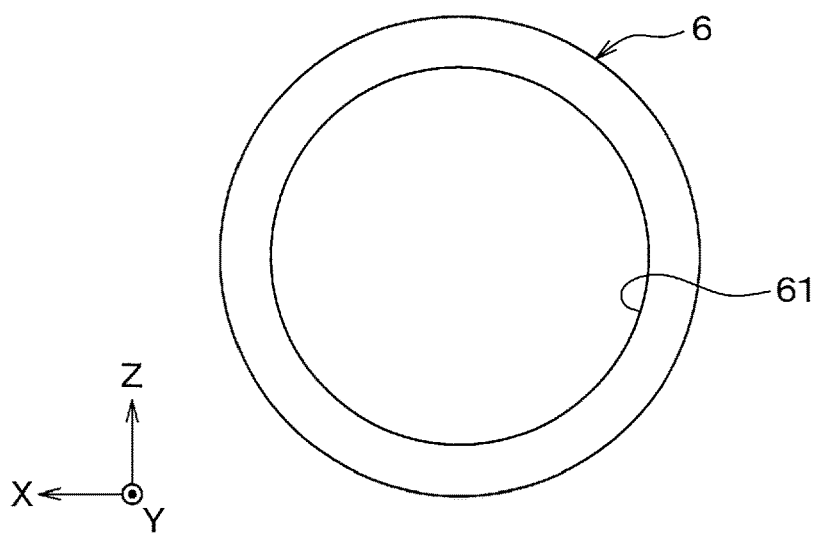
FIG. 4B is a front view of the anti-vibration spacer in FIG. 4A.

Referring to FIGS. 4A and 4B, the anti-vibration spacer 6 is in the shape of a thin ring and has a thickness as measured in the axial direction. The anti-vibration spacer 6 is made from an elastic synthetic resin, such as silicon rubber. Specifically, the anti-vibration spacer 6 is in the form of a disc plate and has the spacer through-hole 61 formed in the center of the disc plate.

The anti-vibration spacer 6 is, as clearly illustrated in FIGS. 2A and 2C, arranged between the flange 71, as will be described later in detail, of the bezel 7 and the front bumper V3 to minimize the transmission of mechanical vibration between the bezel 7 and the front bumper V3 in the vehicle-mounted state. Specifically, the anti-vibration spacer 6 is firmly retained by the reverse surface 71a of the flange 71 which faces the front bumper V3 and the outer bumper surface V31 in the bumper-mounted state.

BEZEL

Figure 5:
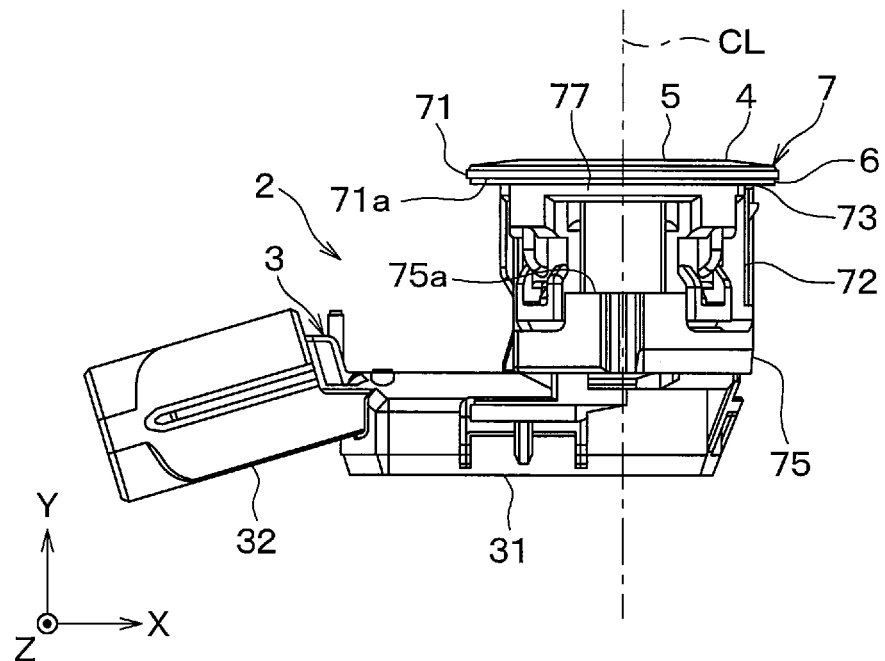
FIG. 5 is a plan view which schematically illustrates a structure of a sub-assembly of a sensor body, an anti-vibration spacer, and a bezel shown in FIG. 2A.

FIG. 5 illustrates the above-described sub-assembly. FIGS.

6A to 6C schematically illustrate the structure of the bezel 7. The structure of the bezel 7 will be described below with reference to FIGS. 2A to 6C.

The bezel 7 serving as a sensor attachment in this disclosure is used to attach the ultrasonic sensors 1 to the front bumper V3 that is a plate-like vehicle body member. The bezel 7 is made in the form of a one-piece member from synthetic resin and includes the flange 71 and the hollow cylinder 72.

The flange 71 is in a ring shape and has a thickness as measured in the axial direction. The flange 71 is located on a front end of the cylinder 72 which faces in the axial direction and extend in the radial direction. The flange 71 is shaped to have an outer dimeter larger than an inner diameter of the mounting hole V5. In the bumper-mounted state, the flange 71, as clearly illustrated in FIGS. 2A and 2C, faces a portion of the outer bumper surface V31 around the mounting hole V5 through the anti- vibration spacer 6.

In the assembled state or the bumper-mounted state, the cylinder 72 is disposed inside the mounting hole V5 and surrounds the cushion 4 and the ultrasonic microphone 5. In other words, the cylinder 72 is shaped to have an outer diameter slightly smaller than the inner diameter of the mounting hole V5 and also has an inner diameter slightly larger than outer diameters of the microphone support 33 and the cushion 4. The cylinder 72 has joint portions, not shown, which achieves detachable engagement with the microphone support 33 in the assembled state.

The cylinder 72 has the spacer housing groove 73 which is formed in a front end portion thereof facing in the axial direction and in which the anti-vibration spacer 6 is disposed. The spacer housing groove 73 has an opening facing in the radial direction. The spacer housing groove 73 occupies an entire circumference of the cylinder 72. The spacer housing groove 73 has a width (i.e., a dimension as measured in the axial direction) substantially identical with the thickness of the anti-vibration spacer 6 and also has a depth (i.e., a dimension as measured in the radial direction) which defines an inner diameter of the spacer housing groove 73 substantially identical with the diameter of the spacer through- hole 61 of the anti-vibration spacer 6.

Figure 6A:
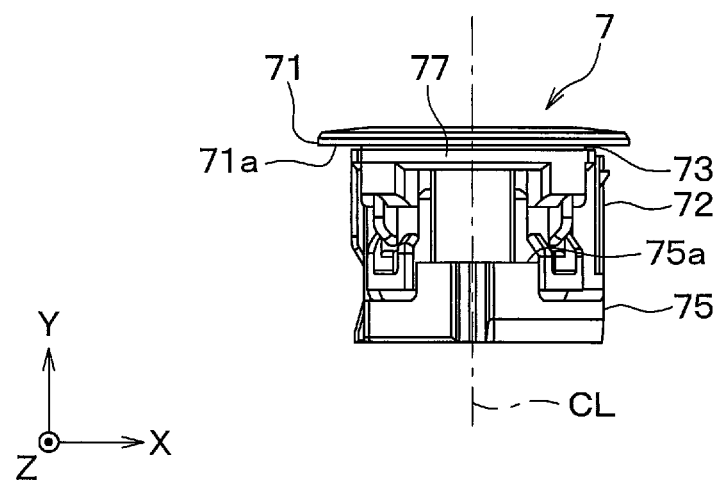
FIG. 6A is an enlarged plan view which shows the bezel in FIG. 5.
Figure 6B:
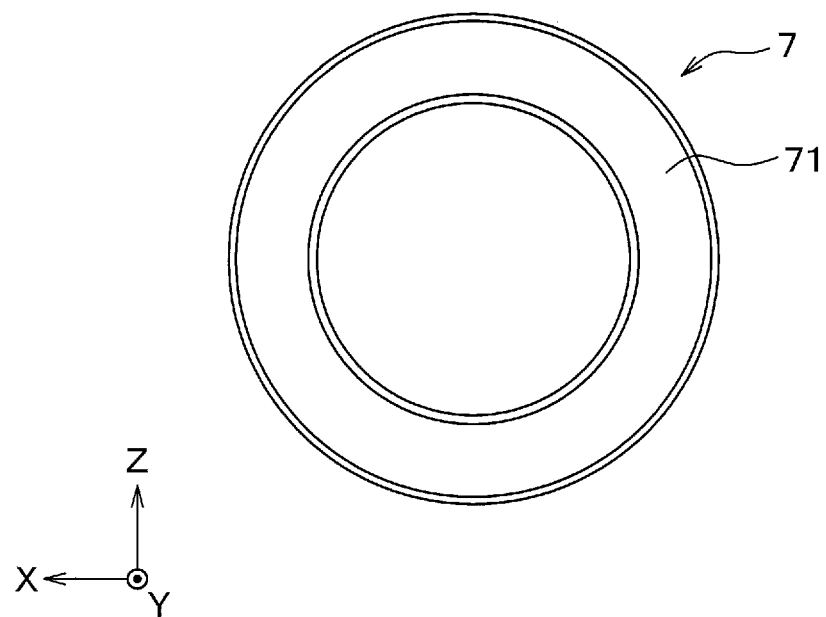
FIG. 6B is a plan view of the bezel shown in FIG. 6A.
Figure 6C:
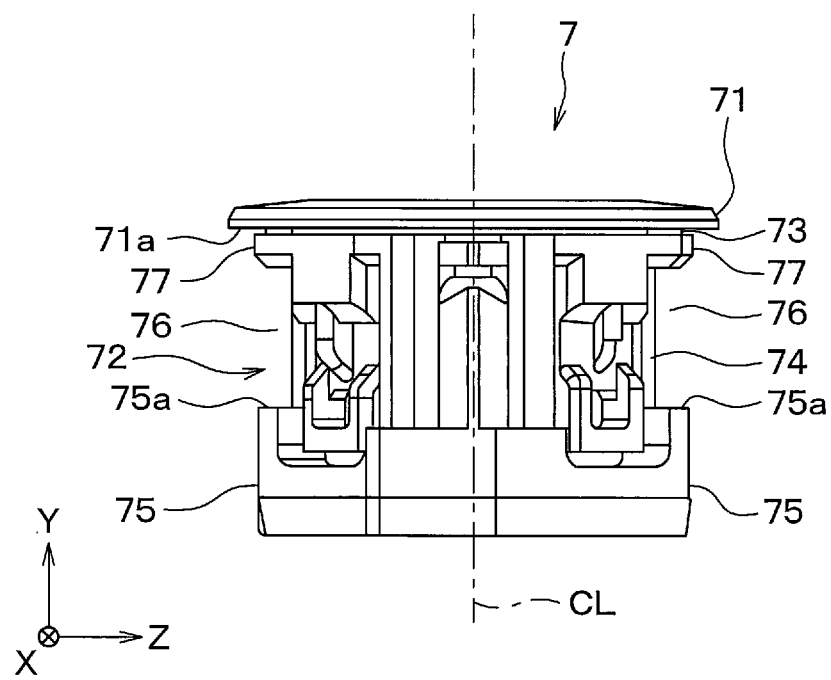
FIG. 6C is a right side view of the bezel shown in FIG. 6A.

Referring to FIG. 6C, the cylinder 72 has the main body 74 which is of a hollow cylindrical shape and occupies a middle portion of the cylinder 72 which extends in the axial direction. The main body 74 extends in the center axis line CL. The main body 74 has a base end facing in the axial direction and also has a pair of base end protrusions 75 formed integrally with the base end of the main body 74. The base end protrusions 75 project in the radial direction. The main body 74 and the base end protrusions 75 are made from the same materials in the form of a seamless one-piece member.

Each of the base end protrusions 75 is formed by a portion of the cylinder 72 which is located closest to the base end of the cylinder 72 in the axial direction. The base end protrusions 75 extend in the radial direction, i.e., a direction parallel to the Z- axis direction in FIG. 6C. Each of the base end protrusions 75 has the retainer contact face 75a which defines a front end surface thereof facing in the axial direction and is in the form of a flat and smooth face shaped to have a normal line oriented parallel to the center axis line CL.

The bezel 7 has a pair of retainer fit grooves 76 formed in portions thereof which are located closer to the front end of the bezel 7 than the retainer contact face 75a are in the axial direction.

The retainer fit grooves 76 have openings which face outward, in other words, away from the center axis line CL. The retainer fit grooves 76 are diametrically or symmetrically opposed to each other across the center axis line CL. The retainer fit grooves 76 define spaces into which the retainer 8 is inserted or fit when the ultrasonic sensors 1 is attached to the front bumper V3. Each of the retainer fit grooves 76 extends in the X-axis direction in the form of a square groove. The base end protrusions 75 serve to hold the retainer 8, as inserted into the retainer fit grooves 76, between itself and the inner bumper surface V32 in the bumper- mounted state.

The retainer fit grooves 76 are defined by the base end protrusions 75 and the front end protrusions 77. The front end protrusions 77 are formed by portions of the cylinder 72 which are closest to the front end of the cylinder 72 in the axial direction. The front end protrusions 77 are located adjacent to the spacer housing groove 73 in the axial direction. In other words, the spacer housing groove 73 is shaped to include air gaps between the flange 71 and the front end protrusions 77.

The main body 74 has the two front end protrusions 77 located on the front end thereof facing in the axial direction. The front end protrusions 77 are joined integrally with the main body 74 and protrude in the radial direction. The main body 74 and the front end protrusions 77 are made from the same materials in the form of a seamless one-piece member. Each of the front end protrusions 77 extends in the circumferential direction. Specifically, the front end protrusions 77, as can be seen in FIGS. 6A and 6C, occupy a portion of the circumference of the bezel 7, in other words, they are located away from each other through air gaps therebetween in the circumferential direction of the bezel 7.

Figure 7:
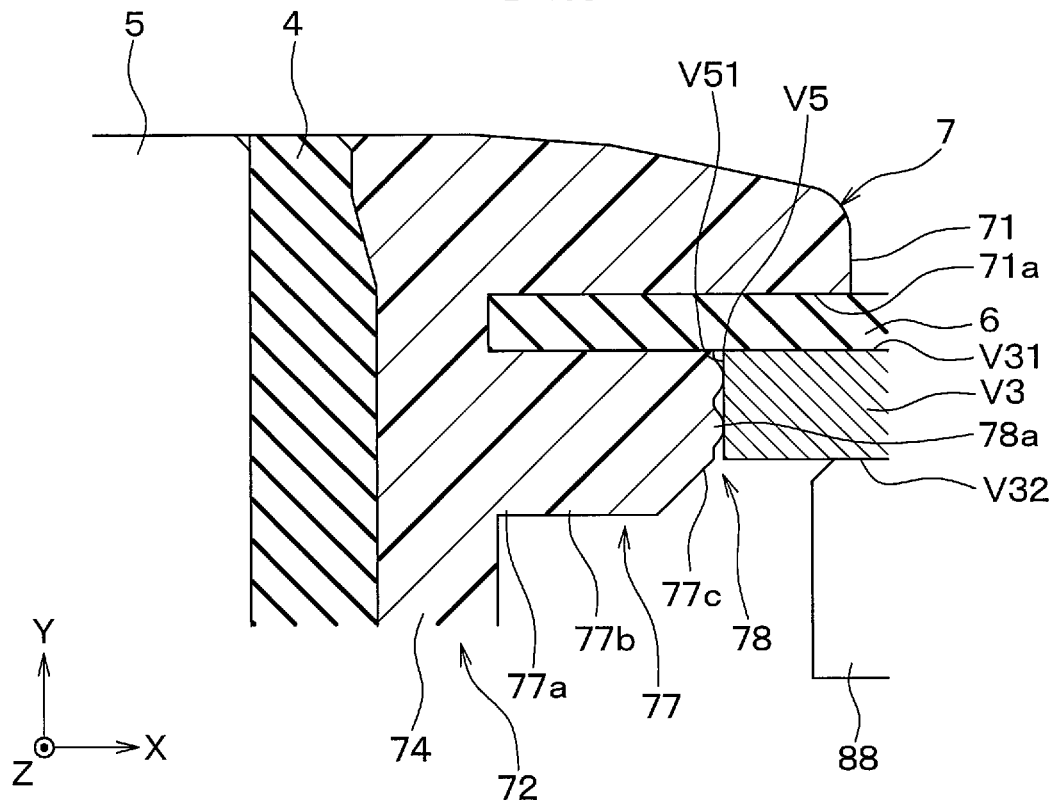
FIG. 7 is a partially enlarged sectional view which illustrates a portion of a bezel and its peripheral region in a vehicle-mounted state in the first embodiment.

FIG. 7 is an enlarged view which illustrates major parts of the bezel 7 in this embodiment and peripheries thereof. Each of the front end protrusions 77, as illustrated in FIG. 7, includes the base portion 77a, the middle portion 77b, and the end portion 77c. The base portion 77a, the middle portion 77b, and the end portion 77c are arranged adjacent to each other in this order in the radial direction.

The base portion 77a is located closest to the main body 74 in the front end protrusion 77 and shaped to have a dimension, as measured in the axial direction, which is larger than the thickness of the front bumper V3. The middle portion 77b is arranged between the base portion 77a and the end portion 77c in alignment therewith in the radial direction. The middle portion 77b has a dimension substantially identical with that of the base portion 77a in the axial direction. The end portion 77c is located farthest from the main body 74 in the front end protrusion 77 and tapered to have a dimension, as measured in the axial direction, which decreases gradually outward in the radial direction.

Through-Hole Facing Portion

The bezel 7 has the through-hole facing portion 78 defined by a portion of the cylinder 72. The through-hole facing portion 78 faces the inner surface V51 of the mounting hole V5 in the radial direction in close proximity to the inner surface V51 to be contactable with the inner surface V51 in the bumper-mounted state. Specifically, the through-hole facing portion 78 in this embodiment is defined by the end portion 77c of the front end protrusion 77 which faces in the radial direction. More specifically, the through-hole facing portion 78 is defined by a surface of the end portion 77c which faces the inner surface V51 in the vicinity of the inner surface V51.

The through-hole facing portion 78 is designed to have a contact surface-decreasing structure which creates a decreased area contacting with the inner surface V51. Specifically, the contact surface-decreasing structure of the end portion 77c has a plurality of protrusions 78a formed on a surface of the end portion 77c which faces the inner surface V51 in close proximity to the inner surface V51. The protrusions 78a project in the radial direction. Each of the protrusions 78a is in a semi-circular shape or a circular conical shape with a round apex.

Retainer

The retainer 8 is, as clearly illustrated in FIGS. 2A to 2C, attached to the sub-assembly fit in the mounting hole V5 to firmly attach the ultrasonic sensors 1 to the front bumper V3. The retainer 8 is formed by a one-piece member made from a hard synthetic resin.

Figure 8A:
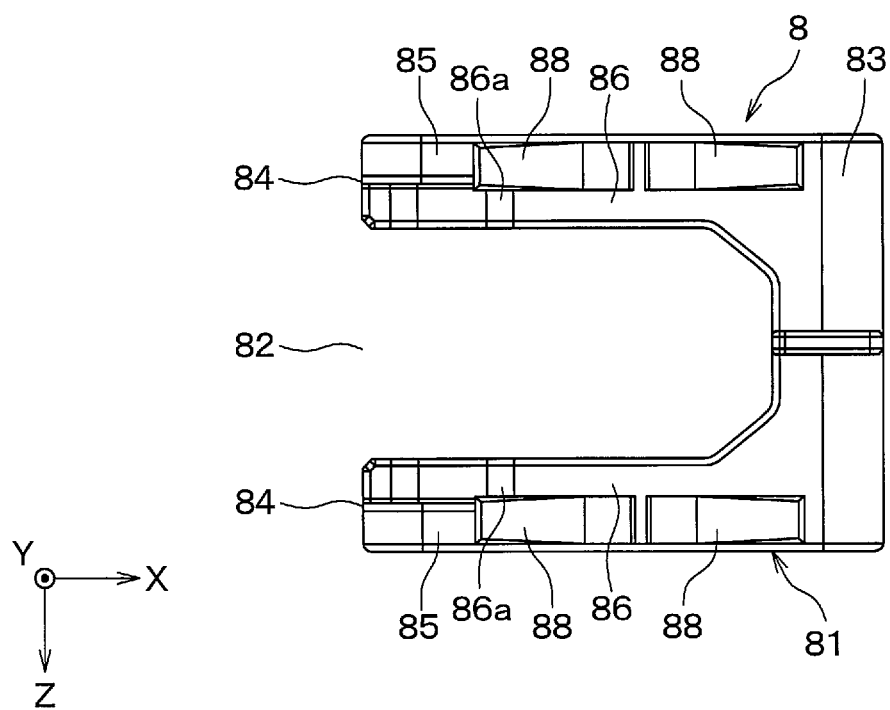
FIG. 8A is a front view of a retainer shown in FIG. 2A.
Figure 8B:
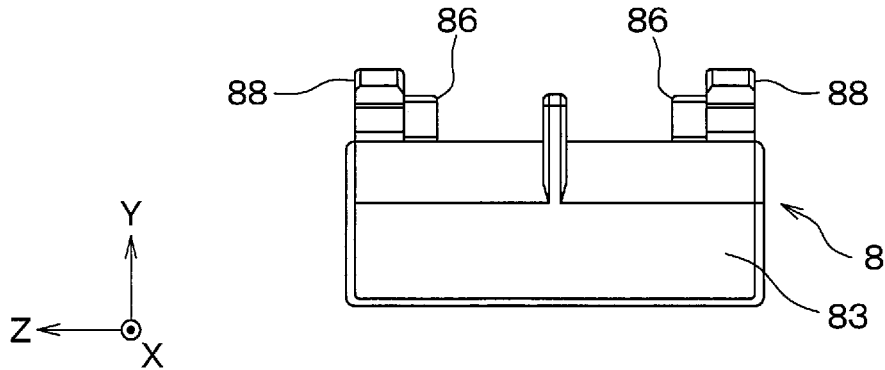
FIG. 8B is a left side view of a retainer shown in FIG. 2A.
Figure 8C:
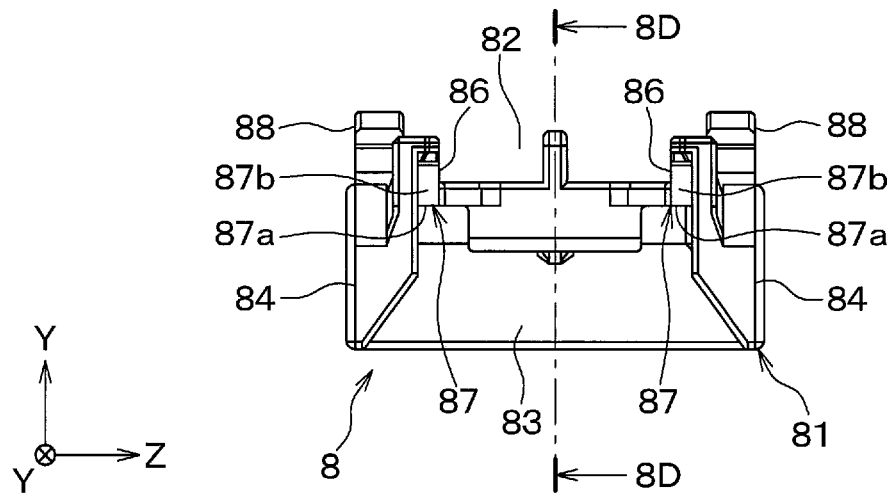
FIG. 8C is a right side view of a retainer shown in FIG. 2A.

FIGS. 8A to 8D schematically illustrate the structure of the retainer 8. The retainer 8, as shown in FIG. 8A, has the retainer body 81 constituting a major body of the retainer 8. The retainer 8 is of a substantially U-shape, as viewed facing the front thereof and has the opening 82 facing the negative X-axis direction. Specifically, the retainer body 81, as can be seen in FIGS. 8A to 8D, includes the connecting portion 82 and a pair of extensions 84. The connecting portion 83 extends in the Z-axis direction, as viewed in the drawings. The extensions 84 extend from opposed ends of the connecting portion 83 in the negative X-axis direction, as viewed in the drawings. The extensions 84 defines the opening 82 therebetween. The opening 82 defines a space in which the bezel 7 is disposed and held by the extensions 84. The extensions 84 are, as clearly illustrated in FIGS. 2A to 8D, mechanically strengthened by the plate-shaped reinforcements 85. Each of the reinforcements 85 has a thickness, as measured in a direction perpendicular to the Z-axis direction, and is bent in a reverse U-shape with an opening facing in the negative Y-axis direction. The reinforcements 85 are located outside the extensions 84, in other words, arranged to face away from the opening 82.

The extensions 84 are equipped with the guides 86. Each of the guides 86 is, as illustrated in FIGS. 8A to 8D, in a plate-shape having a thickness, as measured in a direction perpendicular to the Z-axis direction. Specifically, each of the guides 86 has the bend 86a. Each of the guides 86 extends from the connecting portion 83 to the bend 86a in the negative X-axis direction and also extends from the bend 86a obliquely, in other words, both in the negative X-axis direction and the positive Y-axis direction, as viewed in the drawings.

Each of the guides 86 has the bezel contact face 87 which is defined by an outer surface thereof exposed in the negative Y-axis direction. Each of the bezel contact faces 87 is placed in abutment with the retainer contact face 75a of the bezel 7 in the bumper-mounted state. Each of the bezel contact faces 87 includes the plane surface 87a and the slant surface 87b. The plane surface 87a is located closer to the connecting portion 83 than the bend 86a of the bezel contact face 87 is. The plane surface 87a is smooth or flat and shaped to have a normal line extending parallel to the center axis line CL in the bumper-mounted state. The plane surface 87a is placed in abutment with the retainer contact face 75a in the bumper-mounted state. The slant surface 87b is located closer to the opening 82 than the bend 86a of the bezel contact face 87 is. The slant surface 87b is shaped to have a normal line crossing the center axis line CL at a given small angle (e.g., 15° to)30° in the bumper-mounted state.

Figure 8D:
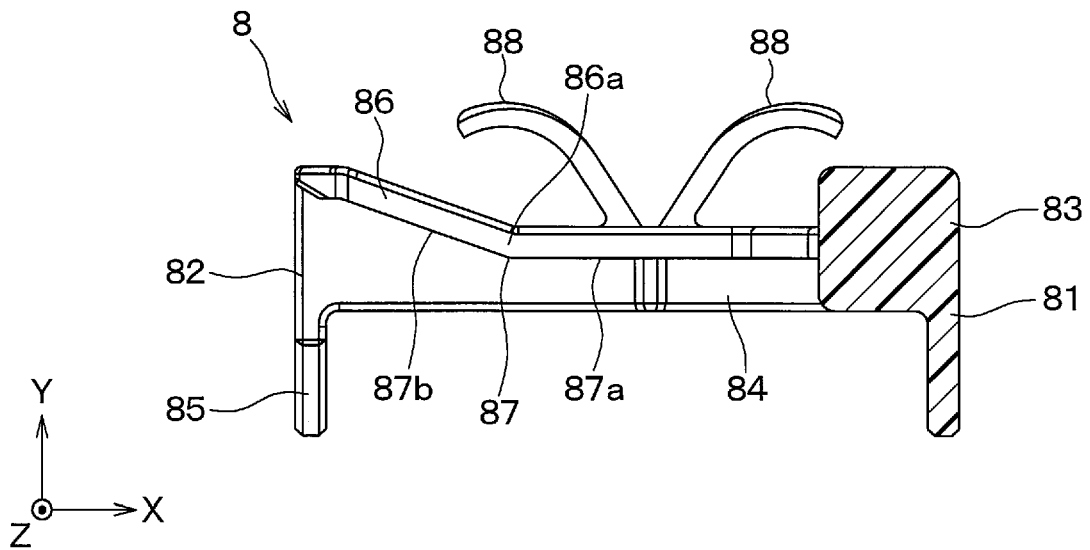
FIG. 8D is a sectional view taken along the line 8D-8D in FIG. 8C.

The retainer 8 has the elastic portions 88 each of which works as a leaf spring and extends from the retainer body 81 in the form of a cantilever. The elastic portions 88, as can be seen in FIG. 8D, extend from a middle portion of a length of each of the extensions 84 to be oblique to the positive Y-axis direction. Specifically, each of the extensions 84 has the two elastic portions 88 arranged in a gull-wing shape. The elastic portions 88 are placed in abutment with the inner bumper surface V32 to be elastically deformable in the bumper-mounted state where the retainer 8 is held between the retainer contact face 75a and the inner bumper surface V32.

Beneficial Advantages

How to attach the ultrasonic sensors 1 to the front bumper V3 and the bumper-mounted state will be described below along with beneficial advantages offered by the structure in this embodiment with reference to the drawings. For the sake of simplicity, the following attachment method or attachment steps for the ultrasonic sensors 1 will be discussed using a right-handed Cartesian coordinate (X, Y, Z) system defined based on the illustrated vehicle-mounted state. The mounting or demounting of the ultrasonic sensors 1 in or from the front bumper V3 or the rear bumper V4 is, as described above, usually achieved after the front bumper V3 or the rear bumper V4 is removed from the vehicle body V1, so that the positive Z-axis direction may be different from the upward direction when the ultrasonic sensors 1 are actually attached to or removed from the front bumper V3 or the rear bumper V4.

First, the sensor body 2 illustrated in FIG. 3 is produced. The anti-vibration spacer 6 illustrated in FIG. 4A is attached to the bezel 7 illustrated in FIG. 6A. Subsequently, the cushion 4 and the ultrasonic microphone 5 of the sensor body 2 are inserted into the bezel 7 on which the anti-vibration spacer 6 is fit. This causes joints, not shown, of the cylinder 72 to engage the microphone support 33, thereby securing the bezel 7 to the sensor body 2. The bezel 7 with the anti-vibration spacer 6 is attached to the sensor body 2 in the above manner, thereby fabricating the sub-assembly illustrated in FIG. 5. In the sub-assembly, the cushion 4 surrounds the ultrasonic microphone 5 in the cylinder 72 of the bezel 7.

The sub-assembly illustrated in FIG. 5 is inserted at the connector 32 into each of the mounting holes V5 from the bumper-outside space SG. Subsequently, the sub-assembly is placed in a temporary assembly state where the anti-vibration spacer 6 faces in direct abutment with or in close proximity to the outer bumper surface V31 of the front bumper V3 with the connector 32 extending in the negative X-axis direction, as viewed facing the reverse surface of the sub-assembly in FIG. 2B. Simultaneously, the retainer 8 is placed in a mountable/demountable state in the bumper-inside space SN. The mountable/demountable state is a state of the retainer 8 where the opening 82 faces in the negative X-axis direction, and the elastic portions 88 face the inner bumper surface V32.

The bezel 7 of the sub-assembly in the temporary assembly state is inserted into the opening of the retainer 8 placed in the mountable/demountable state. Subsequently, the extensions 84 of the retainer 8 are thrust in the negative X-axis direction and then inserted into the retainer fit grooves 76 of the bezel 7 of the sub-assembly. In such insertion of the extensions 84, portions of the guides 86 around the opening 82 are fitted into the retainer fit grooves 76 completely or almost without the elastic portions 88 of the retainer 8 being elastically deformed in the negative Y-axis direction. Afterwards, the slant surface 78b of the bezel contact face 87 of each of the guides 86 is then placed in abutment with the retainer contact face 75a. An additional thrust of the retainer 8 in the negative X-axis direction results in a gradual increase in elastic deformation of the elastic portions 88 in the negative Y-axis direction.

When the retainer 8 is thrust in the negative X-axis direction until the bezel 7 and the connecting portion 83 of the retainer 8 contact with each other, it causes the plane surface 87a of the bezel contact face 87 of each of the guides 86 to contact with the retainer contact face 75a. This causes the retainer 8 to be held by spring pressure produced by the elastic portions 88 firmly between the base end protrusions 75 of the bezel 7 and the inner bumper surface V32. In this way, the retainer 8 is fitted in the sub-assembly in the temporary assembly state, thereby achieving the bumper-mounted state where the ultrasonic sensor 1 is, as illustrated in FIGS. 2A to 2C, mounted in the front bumper V3 or the vehicle-mounted state.

In the bumper-mounted state or the vehicle-mounted state, the cushion 4, the anti-vibration spacer 6, and the bezel 7, as clearly illustrated in FIG. 7, lie between the ultrasonic microphone 5 and the front bumper V3. Specifically, the cushion 7 is held between the ultrasonic microphone 5 and the bezel 7. The anti-vibration spacer 6 is held between the flange 71 of the bezel 7 and the front bumper V3.

Mechanical vibration between the ultrasonic microphone 5 and the front bumper V3 which are opposed to each other through the bezel 7 are thought of as being transmitted through two transmission paths: a first one being a path extending between the flange 71 and the front bumper V3, and the second being a path extending between the front end protrusions 77 of the cylinder 72 and the front bumper V3. Th first transmission path has disposed thereon the anti-vibration spacer 6 made from a synthetic resin elastic material, thereby minimizing the transmission of vibration to the ultrasonic microphone 5.

The second transmission path is, as described above, a path extending between the front end protrusions 77 of the cylinder 72 which face in the axial direction and the front bumper V3 and does not have a vibration absorber, such as the anti-vibration spacer 6. An increase in area of contact between each of the front end protrusions 77 and the inner surface V51 of the mounting hole V5 will accelerate the transmission of vibration to the ultrasonic microphone 5. Particularly, in a case where the front bumper V3 is made of a metallic plate in which the transmissibility of vibration is high, there is a risk that an error in detection by the ultrasonic microphone 5 may arise from the vibration.

The through-hole facing portion 78 of each of the front end protrusions 77 which faces the inner surface V51 of the mounting hole V5 is, as described above, designed to have the contact surface-decreasing structure which creates a decreased area contacting the inner surface V51. Specifically, the through-hole facing portion 78 of each of the front end portions 77 which occupies the surface of the end portion 77c and faces the inner surface V51 in close proximity to the inner surface V51, as described above, has the protrusions 78a projecting in the radial direction. The protrusions 78a decreases the area of contact between each of the front end protrusions 77 and the inner surface V51 of the mounting hole V5, thereby reducing the transmission of vibration through the second transmission path.

The structure in this embodiment is capable of reducing or minimizing the transmission of mechanical vibration between each of the ultrasonic sensors 1 and an attachment object, i.e., the front bumper V3, thereby minimizing a risk of errors in object detection by the ultrasonic sensors 1 which may arise from the vibration between the ultrasonic sensors 1 and the front bumper V3.

Second Embodiment

The second embodiment will be described below with reference to FIGS. 9 and 10. The following discussion will refer only to parts different from those in the first embodiment. The same parts as those in the first embodiment or equivalents thereof will be referred to using the same reference numbers or symbols as those in the first embodiment. In the following discussion, the same explanation as in the first embodiment, therefore, holds true for the parts in the second embodiment indicated by the same reference numbers or symbols as those in the first embodiment unless otherwise specified. The same is true for the third embodiment which will be described later.

The front end protrusions 77 in the above-described first embodiment do not occupy the entire circumference of the bezel 7. In other words, the circumference of the bezel 7 partially has an omission(s) of the front end protrusions 77. Each of the front end protrusions 77 in the first embodiment is designed to have protrusions 78a arranged over the circumference thereof.

Figure 9:
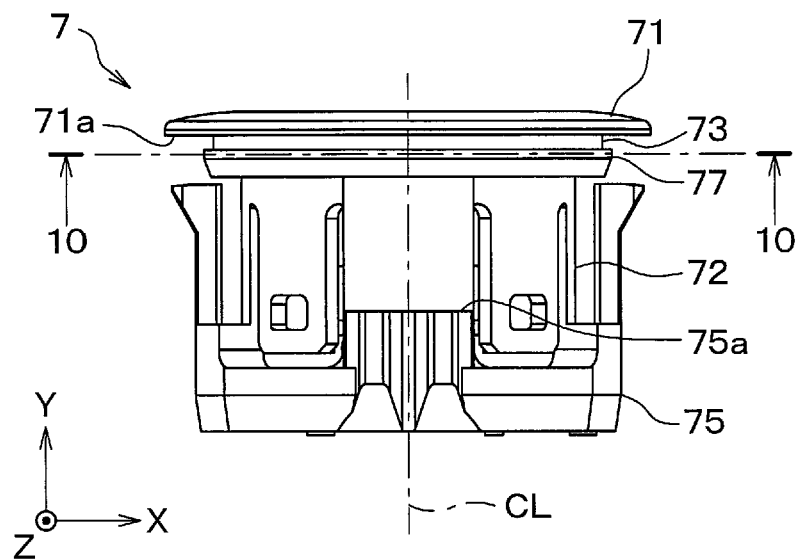
FIG. 9 is a plan view of a bezel in the second embodiment.
Figure 10:
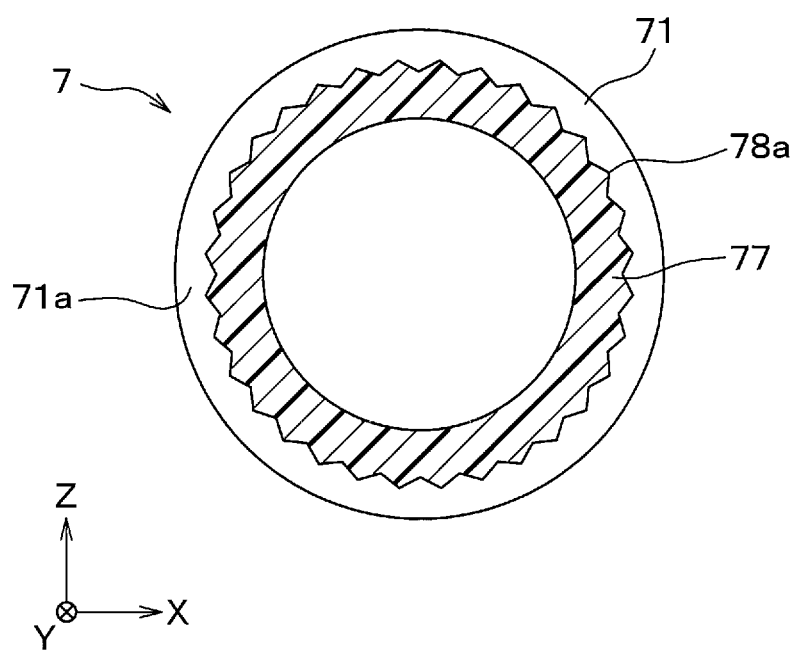
FIG. 10 is a sectional view taken along the line 10-10 in FIG. 9, in other words, perpendicular to a center axis line.

In contrast to the above structure, the bezel 7 in the second embodiment, as illustrated in FIG. 9, has the front end protrusion 77 shaped to occupy the entire circumference of the bezel 7. The front end protrusion 77 has the contact surface-decreasing structure which includes the protrusions 78a which may be designed, as illustrated in FIG. 10, to have the protrusions 78a arranged over the entire circumference of the front end protrusion 77 (i.e., the bezel 7). This reduces the transmission of mechanical vibration between the ultrasonic sensor 1 and the front bumper V3.

Figure 11:
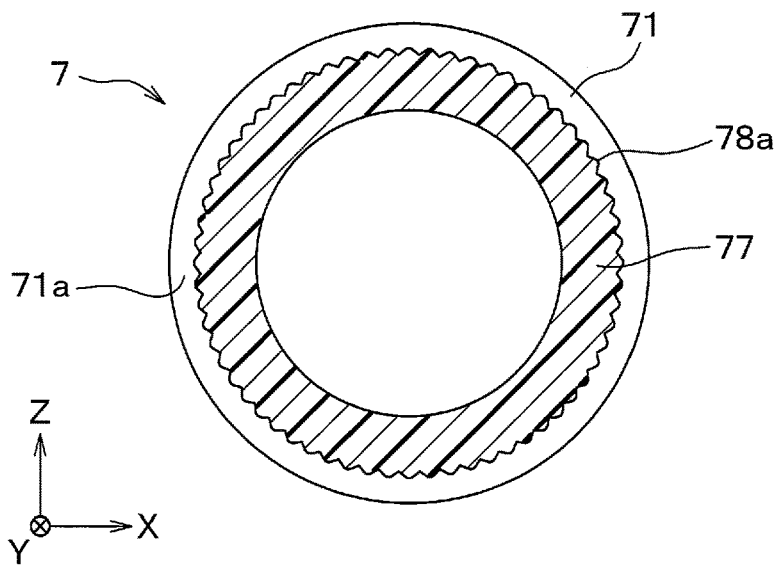
FIG. 11 is a sectional view perpendicular to a center axis line which shows a bezel in the third embodiment.

Third Embodiment The third embodiment will be described below with reference to FIG. 11. The third embodiment is a modification of the second embodiment.

The protrusions 78a having the contact surface-decreasing structure in this embodiment are designed in the form of an embossed pattern, in other words, shaped by raised and recessed portions of the front end protrusion 77 which are finer in size than in the second embodiment. Such configuration of the protrusions 78a offers substantially the same beneficial advantages as in the second embodiment.

Fourth Embodiment

Figure 12:
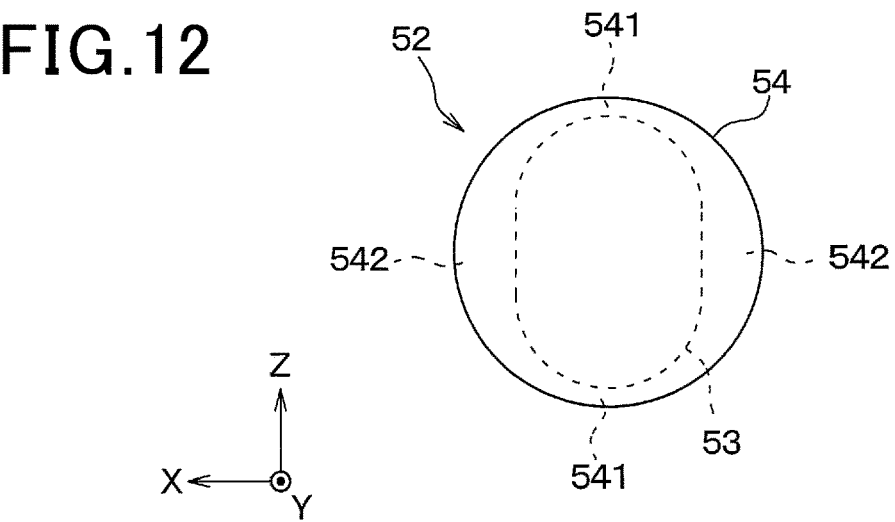
FIG. 12 is a front view which illustrates an example of structure of a microphone case shown in FIG. 3.

The fourth embodiment will be described below with reference to FIGS. 12 and 13. The fourth embodiment is a modification of the third embodiment.

The directivity of each ultrasonic sensor 1 is sometimes required to be regulated to reduce reception of unwanted reflections from a road surface. Typically, such requirements are made to decrease the directivity angle in the vertical direction to be smaller than that in the horizontal direction. In order to achieve such regulation of the directivity, the diaphragm 53 is, as illustrated in FIG. 12, designed to have the in-plane shape with a long dimension and a short dimension perpendicular to the long dimension. Specifically, the diaphragm 53 is of an ellipse or oval shape to have the long dimension oriented in the vertical direction in the vehicle-mounted state.

The side plate 54 of the microphone case 52 includes the thin-walled portions 541 and the thick-walled portions 542. The thin-walled portions 541 lie at opposed ends of the length of the diaphragm 53. The thick-walled portions 542 are opposed to each other in the width-wise direction of the diaphragm 53. The diaphragm 53 is oriented to have the length extending in the vertical direction. The width (i.e., the short dimension) of the diaphragm 53 which is perpendicular to the length thereof extend in the horizontal direction.

The thin-walled portions 541 usually vibrate at a higher frequency than the thick-walled portions 542. This leads to a concern about transmission of vibration between the front bumper V3 and an upper or a lower end portion of the microphone case 52 aligning the thin-walled portions 541 in the vehicle-mounted state.

Figure 13:
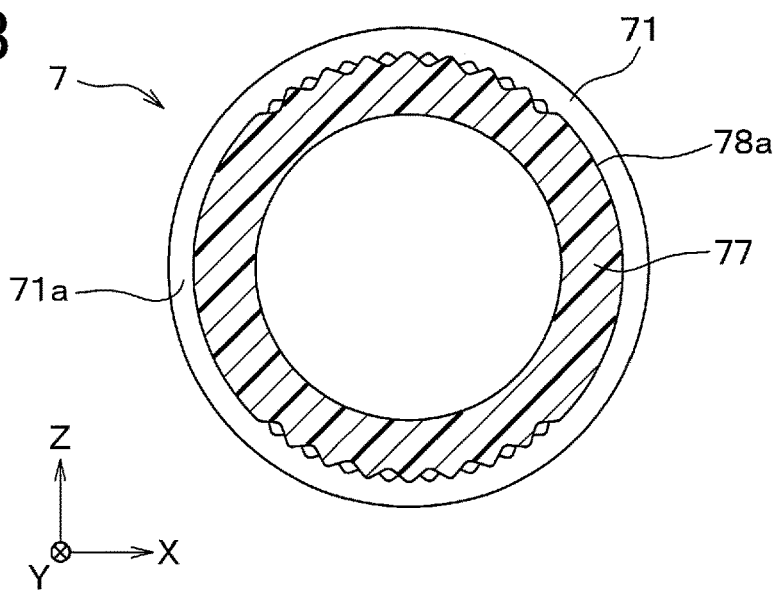
FIG. 13 is a sectional view perpendicular to a center axis line which illustrates a bezel in the fourth embodiment.

In order to alleviate the above problem, the protrusions 78a serving as the contact surface-decreasing structure are, as can be seen in FIG. 13, arranged at least in alignment with the end portions of the diaphragm 53 which are opposed to each other in the length-wise direction of the diaphragm 53. Specifically, the front end protrusion 77 is designed to have the protrusions 78a arranged at two discrete locations on the circumference thereof in alignment with the thin-walled portions 541. With these arrangements, portions of the front end protrusion 77 where there are no protrusions 78a works to minimize undesirable play of the bezel 7 in the vehicle-mounted state, while the protrusions 78a function to reduce the transmission of vibration through the above-described second transmission path in the vehicle-mounted state.

Fifth Embodiment

The fifth embodiment will be described below with reference to FIG. 14. The fifth embodiment is a modification of the first to fourth embodiments. Specifically, the fifth embodiment is designed to have a contact-surface-deceasing structure different from those in the first to fourth embodiments.

Figure 14:
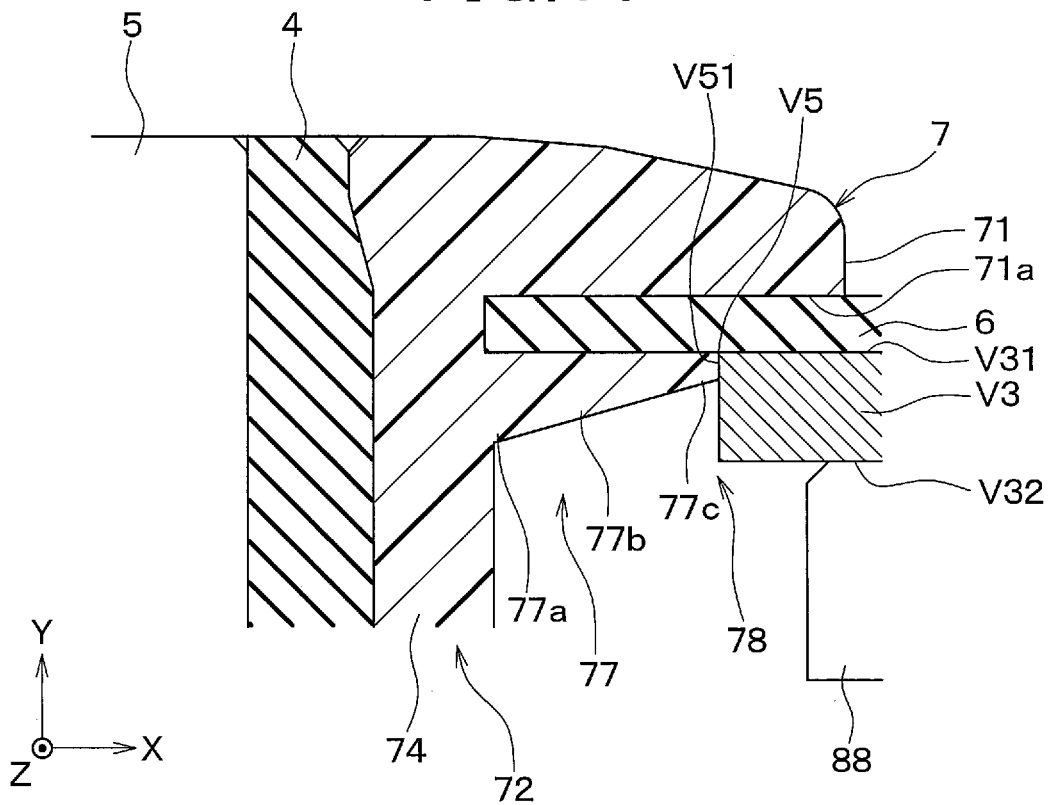
FIG. 14 is an enlarged sectional view which illustrates a portion of a bezel and its peripheral region in the fifth embodiment.

The contact surface-decreasing structure in this embodiment is, as clearly illustrated in FIG. 14, configured in the form of a tapered structure. Specifically, the front end protrusion(s) 77 tapers in the radial direction so that the thickness (i.e., dimension in the axial direction) of the end portion 77c is smaller than the thickness of the front bumper V3. More specifically, the front end protrusion(s) 77 is shaped to have the dimension, as measured in the axial direction, which decreases linearly from the base portion 77a to the end portion 77c.

The front end protrusion(s) 77 is also shaped to have the dimension, as measured in the axial direction, which is smaller than the thickness of the front bumper V3 between the base portion 77a and the end portion 77c. In other words, the tapered structure of the front end protrusion(s) 77 is shaped to be disposed fully inside the mounting hole V5 in the bumper- mounted state.

The front end protrusion(s) 77, therefore, has a decreased area of contact with the inner surface V51 of the mounting hole V5, thereby reducing the transmission of vibration through the second transmission path. The structure of the ultrasonic sensors 1 in this embodiment is, therefore, capable of minimizing the transmission of mechanical vibration from the front bumper V3 to the ultrasonic sensors 1 and a risk of errors in object detection by the ultrasonic sensors 1 which may arise from the vibration.

The front end protrusion(s) 77 may be designed to have the above-described tapered surface which occupies a portion(s) or the whole of circumference thereof. The tapered surface may alternatively be aligned with the end portions of the diaphragm 53 which are opposed to each other in the lengthwise direction thereof.

Sixth Embodiment

The sixth embodiment will be described below with reference to FIG. 15. The fourth embodiment is a modification of the fifth embodiment.

Figure 15:
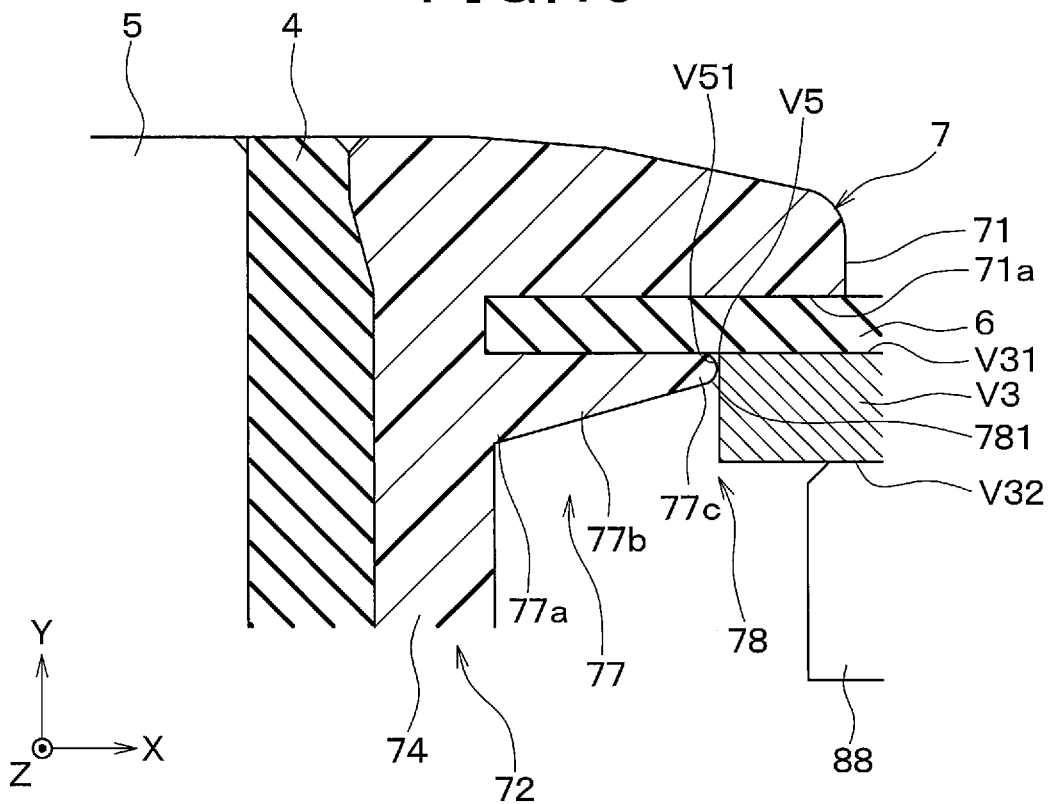
FIG. 15 is an enlarged sectional view which illustrates a portion of a bezel and its peripheral region in the sixth embodiment.

The end portion 77c of the front end protrusion(s) 77 in this embodiment is, as can be seen in FIG. 15, round in a convex shape facing in the radial direction. Specifically, the tapered structure of the front end protrusion(s) 77, as shown in FIG. 15, includes the convex curved end surface 781.

The above configuration of the front end protrusion(s) 77 decreases an area of contact with the inner surface V51 of the mounting hole V5, which minimizes the transmission of vibration through the second transmission path. The structure of the ultrasonic sensors 1 in this embodiment is, therefore, capable of minimizing the transmission of mechanical vibration from the front bumper V3 to the ultrasonic sensors 1 and a risk of errors in object detection by the ultrasonic sensors 1 which may arise from the vibration.

Seventh Embodiment

The seventh embodiment will be described below with reference to FIGS. 16 and 17. The seventh embodiment is a modification of the first to sixth embodiments.

In the adjustment of the directivity of the ultrasonic sensors 1, an angular position of the ultrasonic sensor 1 around the center axis line CL in the circumferential direction may be set to a given position in the bumper-mounted state or the vehicle- mounted state. The ultrasonic sensors 1 may also be regulated in position thereof to orient the connector 32 in a selected direction in order to achieve wiring to the ultrasonic sensor 1.

Figure 16:
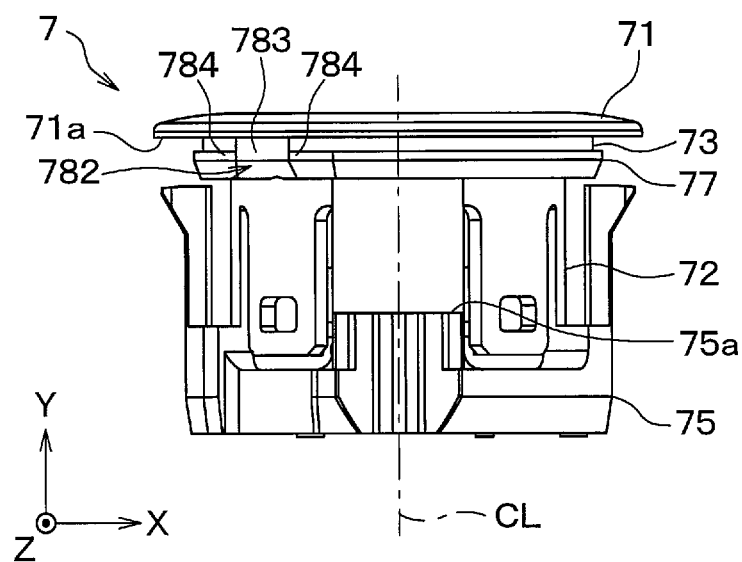
FIG. 16 is a plan view which schematically illustrates a structure of a bezel in the seventh embodiment.

In order to facilitate the above operation, the front end protrusion(s) 77 of the bezel 7 in this embodiment is, as illustrated in FIG. 16, designed to have the bezel joint 782 which will also be referred to as an attachment joint. The bezel joint 782 is configured to achieve firm engagement with the bumper joint V52 illustrated in FIG. 17 which will also be referred to as a vehicle body part joint. The bumper joint V52 includes a portion of the front bumper V3 which occupies a portion of the circumference of the mounting hole V5 and is shaped to create a change in inner diameter of the mounting hole V5 which is substantially circular and extends through the thickness of the front bumper V3. The inner diameter of the mounting hole V5, as referred to herein, is a distance between the center CP of the mounting hole V5 and the inner surface V51.

Specifically, the bezel joint 782 in this embodiment includes the bezel recess 783 and a pair of bezel protrusions 784. The bezel recess 783 is defined by a recessed portion of the front end protrusion 77 which has an opening facing in the radial direction and is located in a portion of the circumference of the front end protrusion 77. The bezel protrusions 784 are created by portions of the front end protrusion 77 which are located on opposite sides of the bezel recess 783 in the circumferential direction and viewed as being relatively raised by forming the bezel recess 783 in the front end protrusion 77.

The bumper joint V52 is contoured to achieve fit in the bezel joint 782. Specifically, the bumper joint V52 includes the bumper protrusion V53 and a pair of bumper recesses 54. The bumper protrusion 53 is defined by a portion of the inner surface V51 of the mounting hole V5 which is raised to face toward the center CP of the mounting hole V5. The bumper protrusion 53 is contoured to achieve fit in the bezel recess 783. The bumper recesses V54 are defined by portions of the inner surface V51 of the mounting hole V5 which are located on opposite sides of the bumper protrusion V53 in the circumferential direction and viewed as being relatively recessed by raising a portion of the inner surface V51 to create the bumper protrusion V53. The bumper recesses V54 are contoured to achieve the fit with the bezel protrusions 784.

The ultrasonic sensor 1 is kept in a selected angular position around the center axis line CL in the bumper-mounted state by achieving firm engagement between the bezel joint 782 and the bumper joint V52. The selected angular position of the ultrasonic sensor 1, as referred to herein, is set to lie in a range of a reference position ±θ around the center axis line CL where θ is an allowable angle, e.g., 0.5° to 1°. The reference position is a position of the ultrasonic sensor 1 where the circumferential center of the bezel joint 782 coincides with that of the bumper joint V52 in the radial direction.

When the ultrasonic sensor 1 is in the reference position, an area of contact between the bezel joint 782 and the bumper joint V52 is minimized. However, when the sub-assembly is rotated by the allowable angle θ from the reference position around the center axis line CL while keeping the engagement between the bezel joint 782 and the bumper joint V52, it will cause an area of contact between the bezel joint 782 and the bumper joint V52 to be maximized because one of circumferentially opposed ends of the bumper protrusion V53 contacts one of circumferentially opposed ends of the bezel recess 783, and one of circumferentially opposed ends of the bumper recess V54 contacts one of circumferentially opposed ends of the bezel protrusions 784. This leads to an increased risk of the transmission of vibration from the front bumper V3 to the ultrasonic sensor 1 as compared with when the ultrasonic sensor 1 is in the reference position.

In order to alleviate the above drawback, the contact surface-decreasing structure of the front end protrusion(s) 77 is designed to have the protrusions 78a arranged at least on the bezel joint 782. This structure of the ultrasonic sensor 1 is, therefore, capable of restricting the angular position of the ultrasonic sensor 1 within a desired range and minimizing the transmission of mechanical vibration from the front bumper V3 to the ultrasonic sensors 1 and a risk of errors in object detection by the ultrasonic sensors 1 which may arise from the vibration.

The front end protrusion(s) 77 may have the contact surface-decreasing structure disposed on a portion(s) thereof other than the bezel joint 782. For instance, the front end protrusion(s) 77 may have the contact surface-decreasing structure over the entire circumference thereof.

Modifications

This disclosure is not limited to the above embodiments. The above embodiment may, therefore, be modified in various ways. The following discussion will refer major modifications. The same parts as those in the above embodiments or equivalents thereof will be referred to using the same reference numbers or symbols as those in the above embodiments. In the following discussion, the same explanation as in the above embodiments, therefore, holds true for the parts in the following modifications indicated by the same reference numbers or symbols as those in the above embodiments unless otherwise specified.

For the sake of simplicity of disclosure, the above discussion has referred only to the ultrasonic sensors 1 mounted in the front bumper V3, but however, this disclosure is not limited to such a mode. The above embodiments may be used with the ultrasonic sensors 1 mounted in the rear bumper V4.

The ultrasonic sensors 1 may be attached to an object other than the front bumper V3 or the rear bumper V4. For instance, the ultrasonic sensors 1 may be mounted in the body panel V2. In this case, the mounting holes V5 are formed in the body panel V2.

The ultrasonic sensors 1 are not limited to sensors which emit or receive ultrasound. For instance, the ultrasonic sensors 1 may be designed only to emit ultrasound or alternatively only to receive returns of ultrasound, as emitted from another ultrasonic sensor, from an object(s) existing around the other ultrasonic sensor.

The parts of the ultrasonic sensors 1 may have structures different from those in the above embodiments or be made from materials different from those in the above embodiments. Two or more parts of the ultrasonic sensors 1 which are made from the same material in the above embodiments may also be made from materials different in kind from each other. Alternatively, two or more parts of the ultrasonic sensors 1 which are made from materials different from each other in the above embodiments may be made from the same material.

Two or more parts of the ultrasonic sensors 1 which are made of a seamless one-piece member in the above embodiments may be made of two or more discrete members adhered to joined to each other. Alternatively, two or more parts of the ultrasonic sensors 1 which are made of discrete members adhered or joined together in the above embodiments may be made of a seamless one-piece member.

The sensor case 3 or the cushion 4 may also be designed to have a structure different from that in the above embodiments. For instance, the mechanical structure or orientation of the connector 32 may be modified. The microphone support 33 or the cushion 4 may alternatively be made in the form of an oval cylindrical, elongated cylindrical, or polygonal cylindrical shape.

For instance, the ultrasonic microphone 5 may be retained by the microphone support 33 of the sensor case 3 without use of the cushion 4. In this case, the cushion 4 may be shaped to be cylindrical and have a dimension substantially identical with that of the ultrasonic microphone 5, i.e., the microphone case 52 in the axial direction.

The outer shape of the ultrasonic microphone 5 or the microphone case 52 needs not to be cylindrical, but may be oval cylindrical or polygonal cylindrical. The ultrasonic device 51 may alternatively be made of an electrical energy-to-mechanical energy transducer other than a piezoelectric device.

The bezel 7 or the retainer 8 which is an attachment member for use in attaching each of the ultrasonic sensors 1 to a plate-like member (e.g., the front bumper V3) of the vehicle body may also be designed to have a structure different from those in the above embodiments. For instance, the bezel 7 and/or the retainer 8 may be made of several parts different from those in the above embodiments.

The bezel 7 may alternatively be designed to have a retainer or a fastener to achieve fitting or attachment of itself to the part of the vehicle body instead of the retainer 8.

The front end protrusion(s) 77 illustrated in FIG. 14 may be designed to have a plurality of protrusions 78a arranged on the tip of the tapered end portion 77c. In other words, the convex curved end surface 781 illustrated in FIG. 15 may include the protrusions 78a arranged adjacent each other in the circumferential direction.

Figure 17:
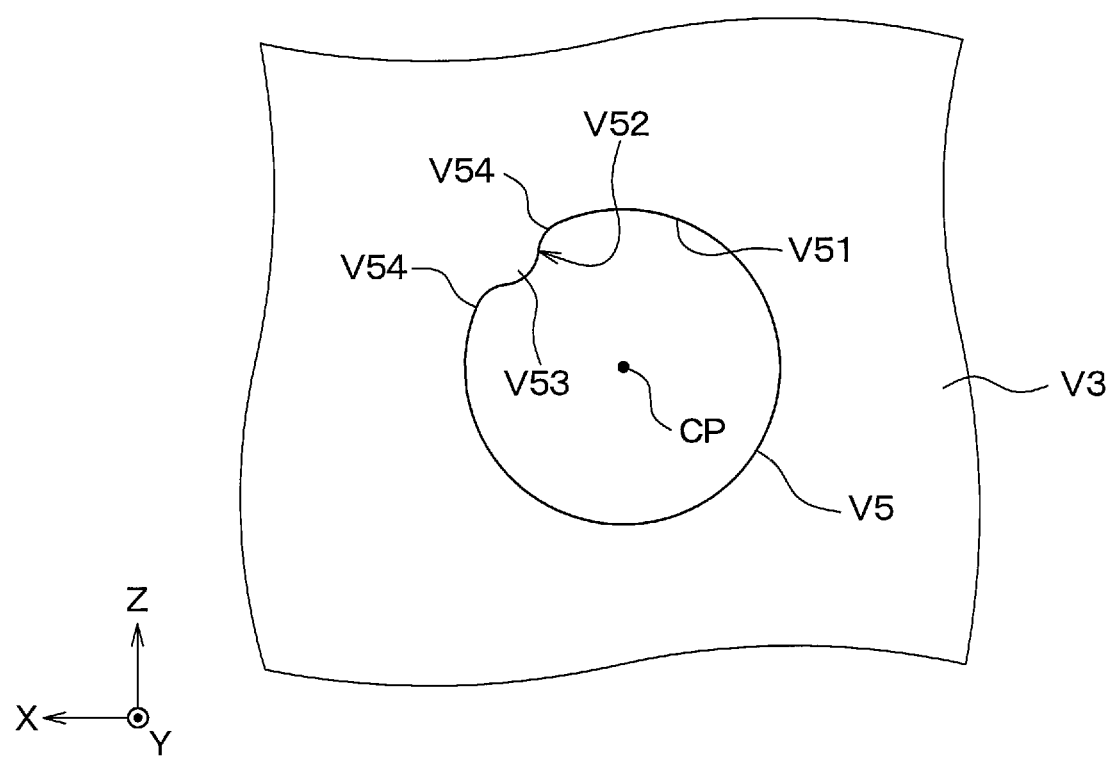
FIG. 17 is a front view which illustrates a configuration of a mounting hole in which the bezel in FIG. 16 is fit.

The concave-convex structures of the bezel joint 782 and the bumper joint V52 illustrated in FIGS. 16 and 17 may be inverse of each other. Specifically, the bezel joint 782 may have protrusions extending in the radial direction outside the remaining portion of the front end protrusion 77, while the bumper joint V52 may have recesses whose depths are defined by increased inner diameters of corresponding portions of the mounting hole V5.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or viewed to be essential in principle.

The modifications are also not limited to the above-described examples. A portion or whole of the embodiment may be combined with one or some of the modifications.

What is claimed is:

1. A sensor attachment for use in attaching an ultrasonic sensor to a vehicle body member, the vehicle body member having a plate-like shape, the ultrasonic sensor being equipped with an ultrasonic microphone which is of a cylindrical shape and extends in an axial direction parallel to a center axis line, comprising:
  a cylinder configured to be disposed in a through-hole formed in the vehicle body member and surround the ultrasonic microphone in a vehicle-mounted state where the ultrasonic sensor is mounted in the vehicle body member; and
  a through-hole facing portion which is defined by a portion of the cylinder and extends in a radial direction perpendicular to the center axis line so as to face an inner surface of the through-hole in proximity thereto to be contactable with the inner surface in the vehicle-mounted state, the through-hole facing portion being configured to have a contact surface-decreasing structure which is configured to minimize an area of contact with the inner surface of the through-hole, wherein the cylinder includes a flange disposed on an end of the cylinder that protrudes outward from the through-hole in a direction away from the through-hole facing portion along the axial direction, the flange comprising a ring shape with an outer diameter larger than a size of the through-hole.

2. The ultrasonic sensor as set forth in claim 1, wherein the cylinder includes a main body and a protrusion, the main body being cylindrical and extending along the center axis line, the protrusion being joined integrally with the main body and defining the through-hole facing portion extending in the radial direction, and wherein the protrusion extends in a circumferential direction around the center axis line.

3. The ultrasonic sensor as set forth in claim 2, wherein the contact surface-decreasing structure is configured as a tapered structure in which the protrusion has an end portion facing in the radial direction, and the end portion is shaped to have a dimension, as measured in the axial direction, which decreases in the radial direction and becomes smaller at the end portion than a thickness of the vehicle body member in the axial direction.

4. The ultrasonic sensor as set forth in claim 3, wherein the tapered structure is shaped to have the dimension, as measured in the axial direction, which is smaller than the thickness of the vehicle body member.

5. The ultrasonic sensor as set forth in claim 3, wherein the end portion is round in a convex shape facing in the radial direction.

6. The ultrasonic sensor as set forth in claim 2, wherein the protrusion includes an attachment joint which is configured to achieve engagement with a vehicle body part joint, the vehicle body part joint lies at a given location of a circumference of the through-hole which is of a circular shape in the vehicle body member, and the vehicle body part joint is shaped to create a change in diameter of the through-hole.

7. The ultrasonic sensor as set forth in claim 6, wherein the attachment joint is configured at least to have the contact surface-decreasing structure.

8. The ultrasonic sensor as set forth in claim 1, wherein the ultrasonic microphone includes a diaphragm which has a thickness, as measured in the axial direction, the diaphragm is configured to have an in-plane shape extending perpendicular to the center axis line and has a long dimension and a short dimension perpendicular to the long dimension, and the contact surface-decreasing structure is arranged at least in alignment with end portions of the diaphragm which are opposed to each other in a length-wise direction of the diaphragm.

9. The ultrasonic sensor as set forth in claim 1, wherein the contact surface-decreasing structure includes a plurality of protrusions projecting in the radial direction.

10. The ultrasonic sensor as set forth in claim 1, wherein the vehicle body member is a metallic plate.

11. An ultrasonic sensor comprising:
a sensor attachment as set forth in claim 1;
an ultrasonic microphone set forth in claim 1;
a cushion which is of a cylindrical shape and made from an elastic synthetic material, the cushion being disposed in the cylinder and surrounding the ultrasonic microphone; and
an anti-vibration spacer which is made from an elastic synthetic material and arranged between the flange and the vehicle body member.

* * * * *